United States Patent [19]
Ting et al.

[11] Patent Number: 5,978,542
[45] Date of Patent: *Nov. 2, 1999

[54] VTR TAPE FORMAT FOR COMPRESSED DIGITAL VIDEO USING OVERLAPPED AREAS FOR FORWARD AND REVERSE HIGH SPEED PLAYBACK

[75] Inventors: Hou-Chun Ting, Chang Hua; Hsueh-Ming Hang, Hsin-Chu; Jang-Zern Tsai, Ma Dou; Chien-Chen Liang, Taichung, all of Taiwan

[73] Assignee: Industrial Technology Research Institute, Taiwan

[*] Notice: This patent is subject to a terminal disclaimer.

[21] Appl. No.: 08/885,369

[22] Filed: Jun. 30, 1997

Related U.S. Application Data

[63] Continuation of application No. 08/485,208, Jun. 7, 1995, abandoned.

[51] Int. Cl.[6] .................................................. H04N 5/91
[52] U.S. Cl. .................................. 386/68; 386/69; 386/81
[58] Field of Search .............................. 386/27, 33, 81, 386/37, 68, 40, 41, 106, 69, 123; 360/64, 33.1

[56] References Cited

U.S. PATENT DOCUMENTS

| | | | |
|---|---|---|---|
| 3,691,315 | 9/1972 | Ellmore | 179/100.2 |
| 4,510,538 | 4/1985 | Sato et al. | 360/84 |
| 4,930,031 | 5/1990 | Nagahara et al. | 360/107 |
| 5,003,411 | 3/1991 | Nagahara et al. | 360/72.2 |
| 5,072,316 | 12/1991 | Kubota et al. | 360/64 |
| 5,168,356 | 12/1992 | Acampora et al. | 358/133 |
| 5,247,397 | 9/1993 | Sato et al. | 360/17 |
| 5,377,051 | 12/1994 | Lane et al. | 360/33.1 |
| 5,450,209 | 9/1995 | Niimura et al. | 358/335 |
| 5,532,835 | 7/1996 | Nakagaki et al. | 358/335 |
| 5,583,650 | 12/1996 | Lane et al. | 386/81 |
| 5,647,048 | 7/1997 | Ting et al. | 386/68 |

OTHER PUBLICATIONS

The Grand Alliance HDTV System Specification, version 2.0, Chapter 5, Dec. 17, 1994.

*Primary Examiner*—Douglas W. Olms
*Assistant Examiner*—David R Vincent
*Attorney, Agent, or Firm*—Proskauer Rose LLP

[57] ABSTRACT

Tape formatting, tracking and trick mode data generation are disclosed for providing trick modes for compressed video stored on a video tape. The tape is formatted so that trick mode data is recorded at normal speed within certain areas delineated by predetermined boundaries that are within a maintainable range of a predetermined ideal scan path of the heads. These boundaries are oblique to the normal speed tracks and define trick mode data areas in which trick mode data may be recorded. To facilitate tracking, sync words and trick mode identification codes are interleaved within the trick mode data areas. During tracking, the heads reproduce the sync words and identification codes, and the identification codes that match the currently utilized trick mode are counted. The count during a current interval is compared to a count during a previous interval or a threshold to determine if the heads have locked onto the ideal scan path or deviated therefrom. Trick mode data is generated by replicating a limited portion of the compressed video data of selected pictures, which trick mode data can be independently reproduced, decoded and presented during trick mode playback.

12 Claims, 23 Drawing Sheets

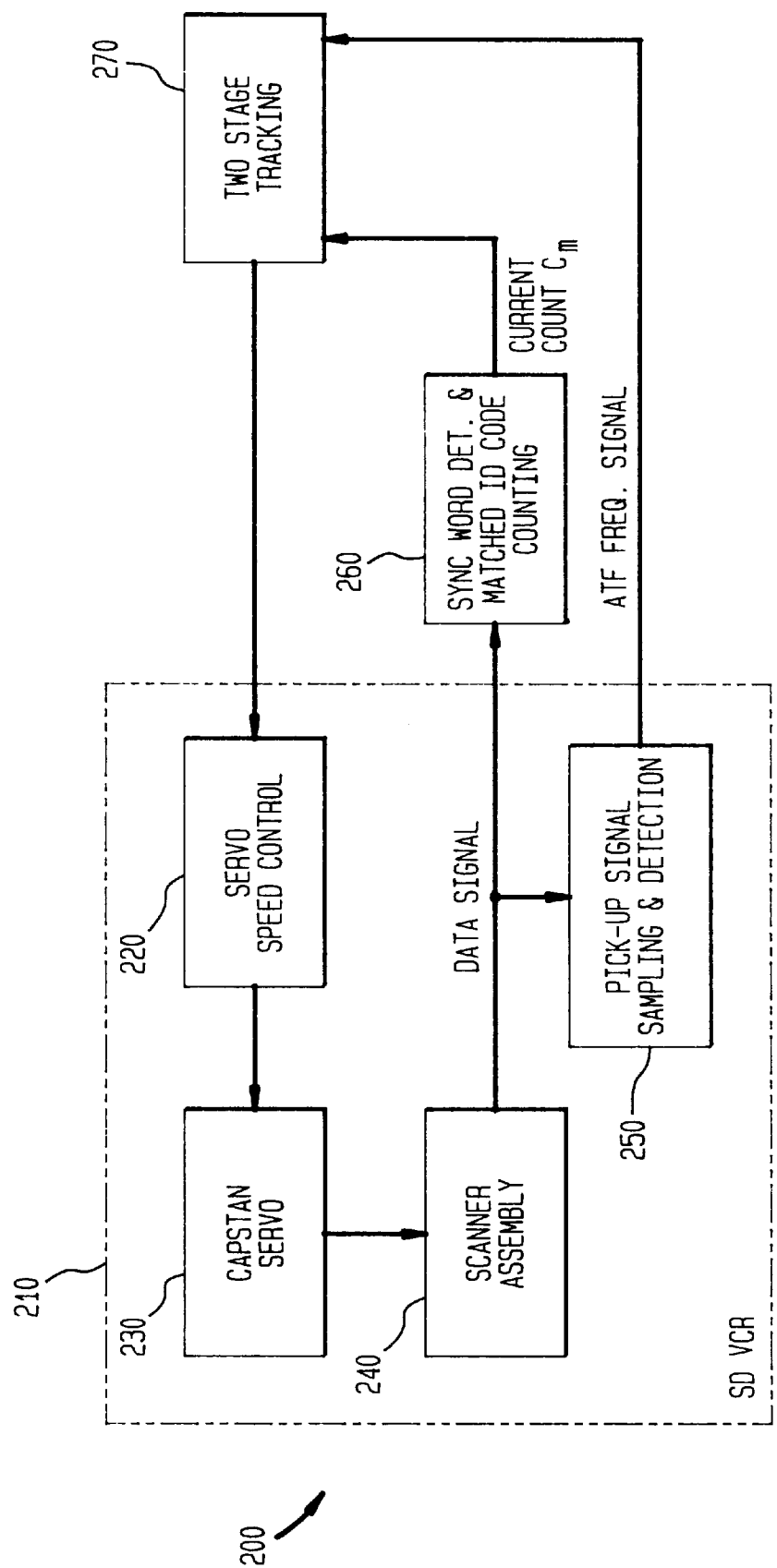

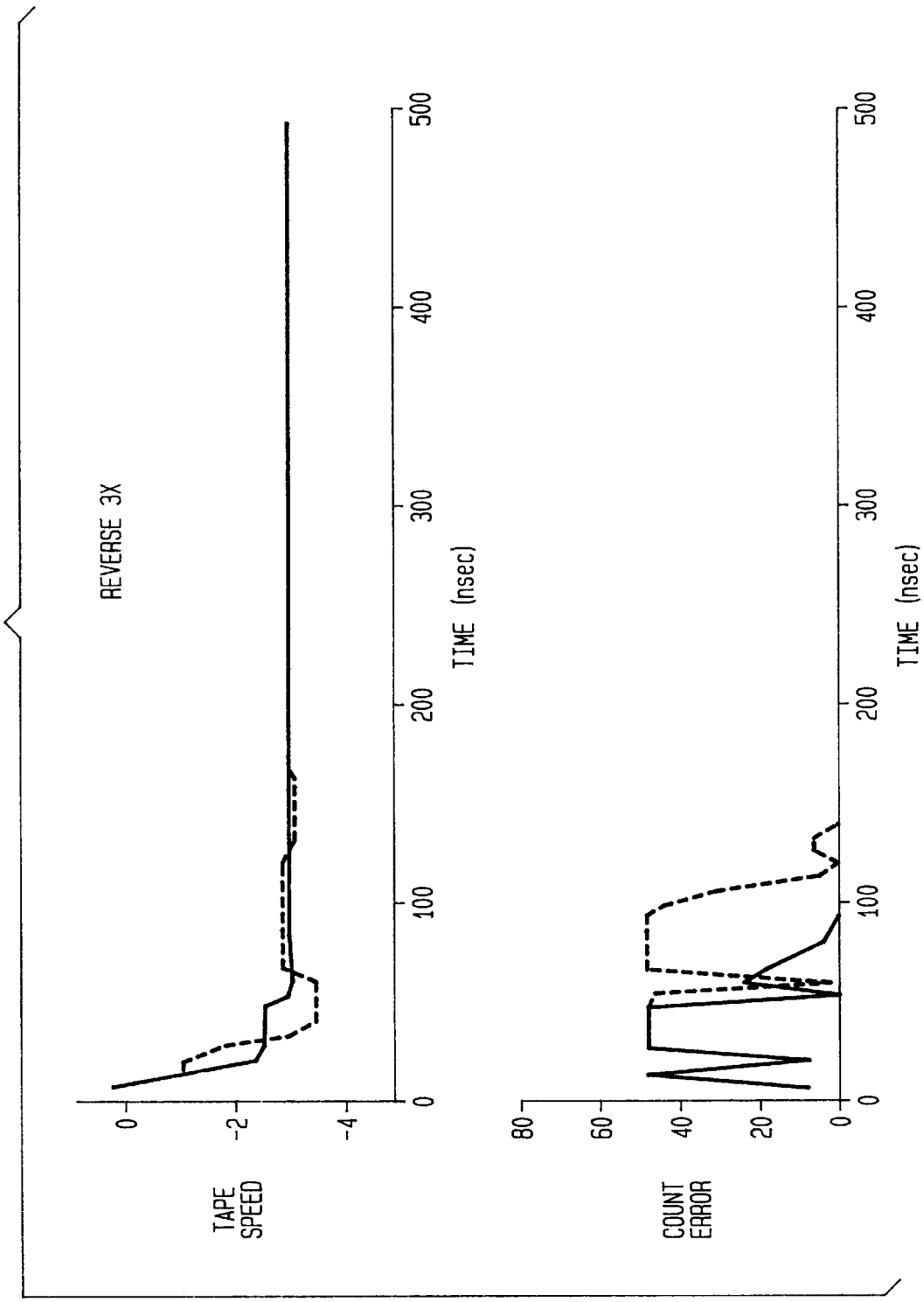

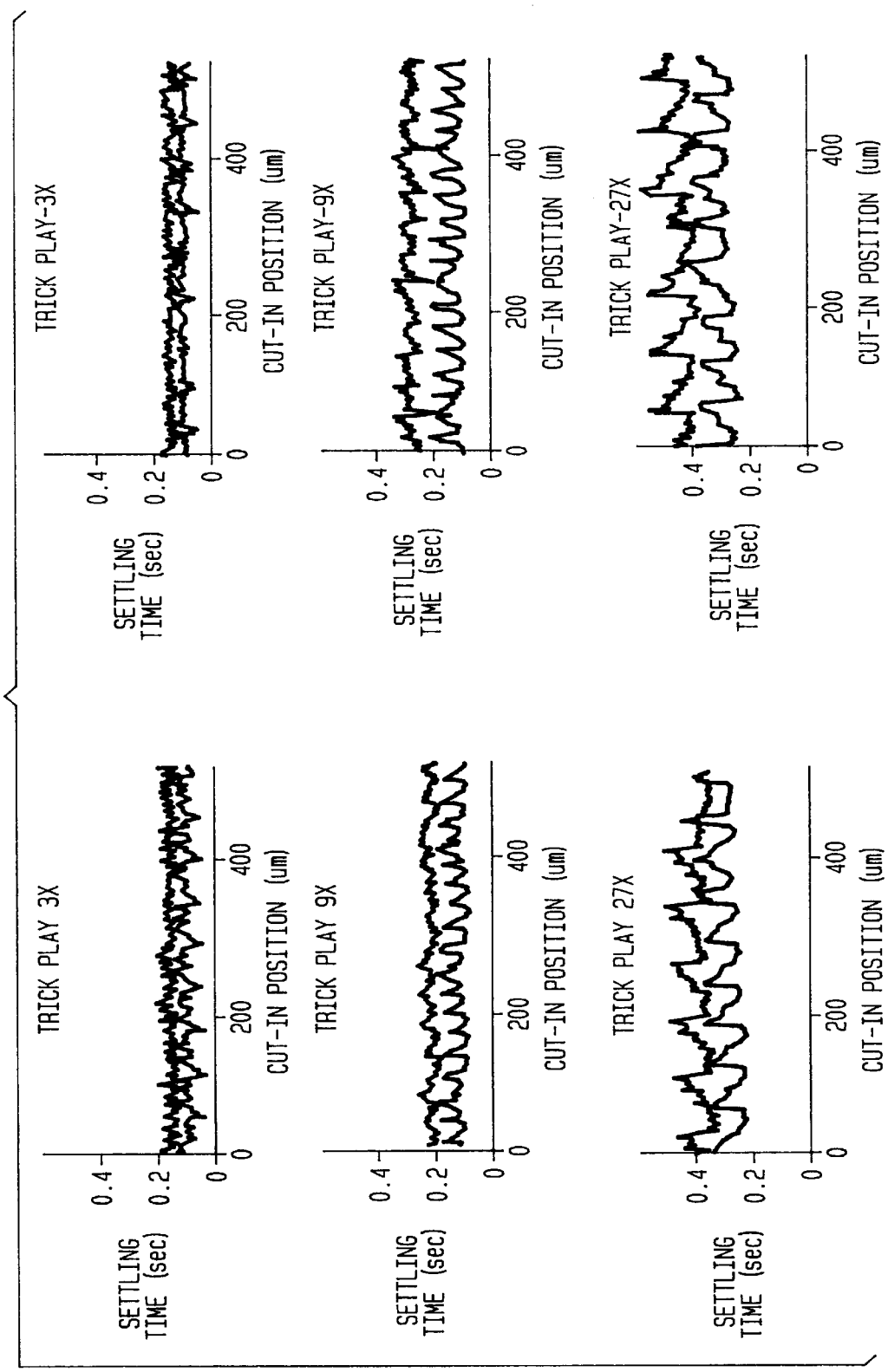

FIG. 20

| TIME | 0 | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 72 | 75 | 78 | 81 | 84 | 87 | 90 | 93 | 96 | 99 | 102 | 105 | 108 |
|---|---|---|---|---|---|---|---|---|---|---|---|---|---|---|---|---|---|---|---|---|---|---|---|---|---|---|---|---|---|---|---|---|---|---|---|---|---|
| GOP=9 | | | | | | | | | | | | | | | | | | | | | | | | | | | | | | | | | | | | | |
| I FRAME | 0 | | | 9 | | | 18 | | | 27 | | | 36 | | | 45 | | | 54 | | | 63 | | | 72 | | | 81 | | | 90 | | | 99 | | | 108 |
| ±3 | 0 | 0 | 0 | 9 | 9 | 9 | 18 | 18 | 18 | 27 | 27 | 27 | 36 | 36 | 36 | 45 | 45 | 45 | 54 | 54 | 54 | 63 | 63 | 63 | 72 | 72 | 72 | 81 | 81 | 81 | 90 | 90 | 90 | 99 | 99 | 99 | 108 |
| ±9 | 0 | 0 | 0 | 0 | 0 | 0 | 0 | 0 | 0 | 27 | 27 | 27 | 27 | 27 | 27 | 27 | 27 | 27 | 54 | 54 | 54 | 54 | 54 | 54 | 81 | 81 | 81 | 81 | 81 | 81 | 81 | 81 | 81 | 99 | | | |
| ±27 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 81 | | | | | | | | | |
| GOP=12 | | | | | | | | | | | | | | | | | | | | | | | | | | | | | | | | | | | | | |
| I FRAME | 0 | | | | | | | | | | | | 36 | | | | | | 48 | | 60 | | | | 72 | | | | 84 | | | | 96 | | | | 108 |
| ±3 | 0 | 0 | 0 | 12 | 12 | 12 | 24 | 24 | 24 | 36 | 36 | 36 | 36 | 36 | 36 | 45 | 48 | 48 | 48 | 48 | 60 | 60 | 60 | 60 | 72 | 72 | 72 | 72 | 84 | 84 | 84 | 84 | 96 | 96 | 96 | 96 | 108 |
| ±9 | 0 | 0 | 0 | 0 | 0 | 0 | 0 | 0 | 0 | 27 | 27 | 27 | 36 | 36 | 36 | 27 | 36 | 36 | 36 | 36 | 60 | 60 | 60 | 72 | 72 | 72 | 72 | 72 | 72 | 84 | 84 | 72 | 96 | 108 | | | |
| ±27 | 0 | 0 | 0 | 0 | 0 | 0 | 0 | 0 | 0 | 0 | 0 | 0 | 0 | 0 | 0 | 0 | 0 | 0 | 0 | 0 | 0 | 36 | 0 | 0 | 54 | 0 | 0 | 81 | | | | | | | | | |
| GOP=15 | | | | | | | | | | | | | | | | | | | | | | | | | | | | | | | | | | | | | |
| I FRAME | 0 | | | | | 15 | | | | | 30 | | | | | 45 | | | | | 60 | | | | | 75 | | | | | 90 | | | | | 105 | |
| ±3 | 0 | 0 | 0 | 0 | 15 | 15 | 15 | 15 | 15 | 30 | 30 | 30 | 30 | 30 | 45 | 45 | 45 | 45 | 45 | 45 | 60 | 60 | 60 | 60 | 75 | 75 | 75 | 75 | 75 | 75 | 90 | 90 | 90 | 90 | 90 | 105 | 105 |
| ±9 | 0 | 0 | 0 | 0 | 0 | 0 | 0 | 0 | 0 | 0 | 0 | 0 | 0 | 0 | 45 | 45 | 45 | 45 | 45 | 45 | 45 | 45 | 45 | 45 | 45 | 75 | 75 | 45 | 45 | 75 | 90 | 90 | | | 105 | 90 | |
| ±27 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 45 | 0 | 0 | 0 | 0 | 45 | 0 | | 0 | | | | | | 0 |

VTR TAPE FORMAT FOR COMPRESSED DIGITAL VIDEO USING OVERLAPPED AREAS FOR FORWARD AND REVERSE HIGH SPEED PLAYBACK

This is a continuation of application Ser. No. 08/485,208, filed Jun. 7, 1995 now abandoned.

RELATED APPLICATIONS

The following applications are commonly assigned to the assignee of the present application:

U.S. patent application Ser. No. 08/485,207, entitled "TRICK MODE VTR TRACKING FOR COMPRESSED VIDEO", filed on even date herewith for Hou-Chun TING, Hsueh-Ming HANG, Jang-Zern TSAI and Chien-Chen LIANG, and U.S. patent application Ser. No. 08/482,656, entitled "TRICK MODE VTR INFORMATION GENERATION FOR COMPRESSED VIDEO", filed on even date herewith for Hou-Chun TING, Hsueh-Ming HANG, Jang-Zern TSAI and Chien-Chen LIANG.

The above-listed patent applications contain subject matter that is related to the subject matter of the present application. The contents of the above-listed applications are incorporated herein by reference.

FIELD OF THE INVENTION

The present invention relates to a tape format for facilitating trick mode playback, i.e., fast forward or reverse playback, of compressed video pictures or images. The present invention also relates to tracking the compressed video information during trick mode playback. Furthermore, the present invention relates to generating, from the compressed video pictures, information that is necessary for presenting the compressed pictures during trick mode playback.

BACKGROUND OF THE INVENTION

In order to understand the present invention it is useful to review the state of the art of video tape transport devices and video tape formats. It is also beneficial to review certain aspects of video compression. Both are discussed below.

Video Tape Transport and Formatting

FIG. 1 shows a conventional video tape transport and scanner assembly 10, which scanner includes a rotary drum 14 with recording/playback heads A,B positioned thereon. (The invention is illustrated herein using a two head A,B drum 14 although the principles described herein are equally applicable to drums having a different number of heads such as four.) A video tape 12 is wrapped partially around the circumference of a drum 14, e.g., 180° around the circumference of the drum 14. The tape 12 is transported around the circumference of the drum 14. As shown, the tape is transported at angle θ to a line perpendicular to the axis of rotation of the drum 14. While the tape is transported in the indicated direction, the recording/playback heads A,B rotate in the indicated direction. As each head A or B rotates in the proximity of the portion of the tape 12 wrapped around the cylinder, the head A or B scans over a portion of the tape 12. Each head A or B scans a portion of the tape 12 in a round robin fashion.

FIG. 2 illustrates the scanning of the heads A,B over the tape 12 in greater detail. As shown, each head A or B scans a diagonal segment of the tape 12 referred to as a track 18. During recording, a signal (e.g., an analog composite NTSC or PAL video signal) is recorded by the heads A and B onto the tracks 18 as each head A or B scans a track 18. (Illustratively, alternate tracks are recorded with opposite magnetic polarities, as shown by oppositely slanted diagonal lines, to reduce inter-track interference.) Likewise, during playback, the signal is reproduced from the tracks as the heads A and B scan each track 18. The angle $\theta_r$ of the track 18 with respect to the tape axis depends on the relative transport speed of the tape 12 and the rotational speed of the drum 14 and the angle of transport θ°. As may be appreciated, to reproduce a signal properly, the transport and scanner assembly 10 must cause each head A,B to substantially scan each diagonal track 18 in sequence and in relative alignment with the angle of the track 18, as shown by the arrow 25. To that end, an automatic tracking frequency (ATF) word is illustratively recorded on each track 18, which ATF word is reproduced by a head A or B during playback. The ATF word of each track produces a signal with a particular frequency. As shown in FIG. 1, this signal is fed to a feedback circuit 22 which controls the drum servo 24 and the capstan servo 26. The feedback circuit 22 compares the frequency of the ATF signal to a target frequency. Depending on this comparison, the relative speed of the drum 14 and the tape 12 transport is either increased or decreased to ensure that the heads A,B scan each track 18 successively.

In a conventional analog VTR, each field of video occupies an equal amount of space on the tape. In particular, each field is recorded on a single track; there is a one-to-one correspondence between tracks and fields. Thus, during playback, the scanning of one head A or B produces a video signal for presenting one field of the video on a display device.

The trick modes of concern herein are fast forward and fast reverse playback modes in which the video information is played back at a faster rate than the normal playback speed. In order to provide such fast or n×normal speed playback, only a fraction of the video information is presented on the display device. For instance, during 3×normal speed playback, only one third of the video information is presented on the display device. During fast forward or fast reverse, the relative speeds of the tape and the rotation of the heads is much faster than during normal speed playback. Thus, the heads do not scan in relative alignment to a single track but rather cross a number of tracks as illustrated by the arrow 30 in FIG. 2. Note that each track corresponds to a single field. Furthermore, there is a correspondence between the location within a given track 18 in which a particular portion of the video information is recorded and the location of the portion of the field that the particular video information portion reproduces. Stated another way, assume the scan of a head A or B crosses the first, middle and last thirds 45, 50 and 55 of three tracks 60, 65, 70, which tracks 60, 65, 70 correspond to first, second and third consecutively displayed fields. This scan produces a video signal with video information for the first third of the first field, the middle third of the second field and the last third of the third field. Thus, the video signal produced by an n×normal speed playback includes a relative piece of the video signal from n different fields, each at a respective portion of the image. Because there is a large correlation from field to field, this "piecemeal" video signal can be presented as an intelligible image; the viewer will perceive a single, reasonably correlated image of low fidelity, even though the user is viewing concatenated portions from n fields.

Video Compression

Advantageously, an audio-visual presentation or program bearing signal is digitized and compressed before the video signal is recorded on the video tape. For example, the video and audio portions of an audio-video program may be compressed according to the Motion Picture Experts Group (MPEG) II recommendations. See ISO/IEC DIS 13818-2: Information Technology—Generic Coding of Moving Pictures and Associated Audio Information. The contents of this document are incorporated herein by reference. Illustratively, such encoding and storage produces a hierarchically organized signal. Furthermore, yet another layer in the hierarchy may be provided, namely, a storage or channel layer and a tape format, for formatting such a compressed MPEG II signal for physical storage on the tracks of a tape. In summary, the different layers of the hierarchy are as follows:

(1) video and audio elementary streams, which contain the raw compressed video and audio data, (2) a transport stream (or program stream) which contains the video elementary streams, audio elementary streams and other private data (such as closed-captioned text) of one or more audio-visual programs, and (3) a storage/channel stream, including a tape format, which encapsulates one or more transport streams with, amongst other things, error recovery data and which physically organizes the data into individual tracks on the tape.

MPEG II provides a specification for the elementary stream and transport stream layers and is believed to be a preferred way to compress and organize video and associated audio information. Therefore, this invention is illustrated using the above hierarchy and in particular, using MPEG II compliant elementary streams and transport streams. Each of these streams is discussed in greater detail below. Furthermore, because this invention is directed to trick mode playback, i.e., n×normal speed playback, only video reproduction is of concern. Therefore, audio and other non-video data is not discussed for purposes of brevity.

Video Elementary Streams

MPEG II provides for compressing video by reducing both spatial and temporal redundancy. A good tutorial for MPEG II video compression is contained in D. Le Gall, "MPEG: A Video Compression Standard for Multimedia Applications", April 1991, "Communications of the ACM". The contents of this document are incorporated herein by reference. A spatial encoder 80 is shown in FIG. 3 including an orthogonal transform circuit 82, a quantizer 84 and a variable length encoder circuit 86. Likewise, a spatial decoder 90 is shown including a variable length decoder 96, an inverse quantizer 94 and an inverse orthogonal transform circuit 92, which perform the inverse function of their counterparts 86, 84 and 82. To spatially encode a picture, the picture is divided into blocks of pixels, e.g., 8×8 blocks of pixels. Each block of pixels is orthogonally transformed (e.g., using a discrete cosine transform or DCT) to produce a number of transform coefficients. For example, as shown in FIG. 3, a matrix of transform coefficients are produced by the orthogonal transform circuit 82 for an 8×8 block of pixels. As shown, the horizontal spatial frequencies of the coefficients increase in the right hand direction and the vertical spatial frequencies of the coefficients increase in the downward direction of the matrix. From a psycho-visual perspective, the lower spatial frequency coefficients tend to be more important than the higher spatial frequency coefficients for purposes of decompressing the block to reproduce the original block. Furthermore, the higher frequency coefficients tend to be close to zero in magnitude. The coefficient for the lowest vertical and horizontal frequency is the most important coefficient, and is referred to as the DC coefficient (because it contains information regarding the average intensity of the block of pixels) The other coefficients are referred to as AC coefficients.

As shown by the arrows, the coefficients are read out of the orthogonal transform circuit 82 in a zig-zag fashion in relative increasing spatial frequency, from the DC coefficient to the highest vertical and horizontal spatial frequency AC coefficient $AC_{77}$. This tends to produce a sequence of coefficients containing long runs of near zero magnitude coefficients. The coefficients are quantized in the quantizer 84 which, amongst other things, converts the near-zero coefficients to zero. This produces coefficients with non-zero amplitude levels and runs (or subsequences) of zero amplitude level coefficients. The coefficients are then (zero) run-level encoded and variable length encoded in the variable length encoder 86.

Blocks which are solely spatially encoded such as described above are referred to as intrablocks because they are encoded based only on information self-contained in the block. An intra-picture or I picture is a picture which contains only intrablocks. (Herein, "picture" means field or frame as per MPEG II nomenclature).

In addition to spatial coding, an encoder can also reduce temporal redundancy via temporal coding. In temporal coding, it is presumed that there is a high correlation between groups of pixels in one picture and groups of pixels in another picture of a sequence of pictures. Thus, a group of pixels can be thought of as moving from one relative position in one picture, called an anchor picture, to another relative position of another picture, with only small changes in the luminosity and chrominance of its pixels. In MPEG II, the group of pixels is a block of pixels, although such blocks need not be the same size as those on which spatial coding is performed. (For instance, temporal coding may be performed on "macroblocks" equal in size to four of the blocks which are used for spatial coding. Thus, if spatial coding is performed on 8×8 pixel blocks, temporal encoding is performed on 16×16 pixel macroblocks.) The temporal coding proceeds as follows. A block of pixels, in a picture to be encoded, is compared to different possible blocks of pixels, in a search window of a potential anchor frame, to determine the best matching block of pixels in the potential anchor frame. This is illustrated in FIG. 4. A motion vector MV is determined which indicates the relative shift of the best matching block in the anchor frame to the block of the picture to be encoded. Furthermore, a difference between the best matching block and the block in the picture to be encoded is formed. The difference is then spatially encoded.

Blocks which are temporally encoded are referred to as interblocks. Interblocks are not permitted in I pictures but are permitted in predictive pictures or P pictures or bidirectionally predictive pictures or B pictures. P pictures are pictures which each only have a single anchor picture, which single anchor picture is presented in time before the P picture encoded therewith. Each B picture has an anchor picture that is presented in time before the B picture and an anchor picture which is presented in time after the B picture. This dependence is illustrated in FIG. 5 by arrows. Note that pictures may be placed in the elementary stream in a different order than they are presented. For instance, it is advantageous to place both anchor pictures for the B pictures in the stream before the B pictures which depend thereon (so that they are available to decode the B pictures) even though half of those anchor pictures will be presented after the B pictures. While P and B pictures can have interblocks, some blocks of P and B pictures may be encoded as intrablocks if an adequate matching block cannot be found therefor.

Note, the amount of compressed information in the above encoding processes varies from picture to picture. I pictures tend to require significantly more bits than P and B pictures. Furthermore, it is possible for an encoder to arbitrarily encode inputted video pictures as I,P or B pictures. However, many implementations at least specify that I pictures should be produced every predetermined number of pictures. In particular, MPEG II defines a video stream syntax wherein a group of pictures (GOP) start code is provided followed by a predetermined number of I,P and B pictures. Such GOP's have an I picture as the very first picture.

Also note that only I pictures can be independently decompressed. In order to decode P and B pictures, the anchor frames, on which they depend, must also be decompressed.

Transport Stream

MPEG II provides two higher layer streams called the program stream and the transport stream. However, it is believed that most storage and transmission uses of MPEG II compressed video and audio will utilize the transport stream. Therefore, this invention is explained in the context of the transport stream. A good tutorial of MPEG II transport streams is contained in A. Wasilewski, *MPEG-2 Systems Specification: Blueprint for Network Interoperability*, COMM. TECH., February, 1994. The contents of this document are incorporated herein by reference.

According to the MPEG II standard, each digital elementary stream is first placed into program elementary stream (PES) packets of arbitrary length. The PES packet data, and other data, relating to one or more programs may be combined into one or more transport streams. The transport stream is organized into fixed length (more precisely, 188 byte length) packets. Each of the transport stream packets includes a four byte header and a 184 byte payload.

Each transport packet can carry PES packet data, e.g., video or audio data compressed and formed into streams according to MPEG II syntax, or program specific information (PSI) data. The PSI data, header portions of the PES packet data as well as other portions of a given transport packet may be used to provide information other than elementary stream data which is necessary to decode the PES packet data such as, snapshots of the encoder clock, time stamps for decoding and presenting units (e.g., video pictures) of PES packet data relative to the encoder clock, information regarding which video and audio streams (and other data, such as closed captioned text) contained in the transport stream are related to the same program and where such streams may be found within the transport stream, conditional access information for descrambling or decrypting encrypted PES packet data, etc. A single transport packet may only contain PES packet data for a single stream and PES packet data and PSI data must be placed in separate transport packets. The transport stream packets may also contain optional adaption fields for carrying, amongst other things, private data.

The transport stream contains only limited forward error correction (FEC) information. This is because transport streams are designed to be used ubiquitously in any kind of communication network/system or storage device such as satellite transponders, asynchronous transfer mode (ATM) networks, magnetic and optical disk drives, switched telephone networks, non-switched local area networks, etc. Each of these networks and devices has their own physical format and can introduce different kinds of error and noise. Therefore, FEC has been specifically omitted from the transport layer and is instead provided at the storage or channel layer. Thus, inter-operability is provided (so that a transport stream can be stored and reproduced from any storage device and then transported by any combination of networks and systems, each such system encapsulating and decapsulating the transport stream at that systems endpoints) without a great deal of overhead (i.e., without utilizing a large part of the bandwidth of the transport stream).

Storage (Channel) Layer and Tape Format

MPEG II does not provide a syntax or semantics for this layer. However, the Standard Definition VCR (SDVCR) specification, as developed by several well-known VCR manufacturers and research organizations, may be considered as a de-facto standard. See, HD-Digital VCR Conference, "Basic Specifications for Consumer-Use Digital VCR," August, 1993. Two data rate streams and formats, namely a 25 M bit/sec and a 50 M bit/sec stream and format, for recording on video cassette recorder (VCR) tape have been proposed.

Recently a draft for Advanced Television has been submitted for approval as the HDTV standard for the United States. The submitted draft complies with MPEG II and produces a video elementary stream with a nominal data rate of approximately 18.4 M bits/sec. Assume that a constant rate Dolby AC-3 compressed audio elementary stream of 384 K bits/sec is to be combined with the video elementary stream into an MPEG II transport stream. Combined with the transport stream overhead (assuming no adaption fields) the bit rate of the transport stream is 19.2 M bits/sec. Such a transport stream may be easily encapsulated in the SD VCR data stream for recording on video tape with about 5 M bits/sec extra left over space.

The problem with utilizing the SD VCR channel layer and format for encapsulating and formatting the ATV MPEG II transport stream is that there is no provision for supporting trick play modes on the VTR during playback. First, the information stored on the tape is highly variable from picture to picture. It is therefore difficult to concatenate the picture portions reproduced and decoded from each track portion as the heads obliquely scan a number of tracks. This is because there simply is no relation between the location of information on a track of the tape and the location in the picture to which the information corresponds. Furthermore, it is also not practical to simply display every $n^{th}$ encoded picture from the video tape during nxnormal speed playback. This is because an MPEG II compliant stream contains P and B pictures which can only be decoded and presented using the appropriate anchor pictures from which they were encoded. It is difficult to locate such anchor frames without reproducing the recorded signal in sequence. Considering the oblique scanning constraints of the scanner assembly during high speed playback, this makes playback of only selected pictures very difficult.

It is therefore an object of the present invention to overcome the disadvantages of the prior art. Specifically, it is an object of the present invention to provide a physical storage format/storage layer stream for storing compressed video which facilitates trick mode playback. It is an object of the present invention to provide for proper tracking, in accordance with the tape storage format described herein, to enable recovery of necessary information for trick mode playback. It is another object of the present invention to generate replica information of the compressed video for separate storage according to the described format herein, which replica information is used for trick mode playback.

SUMMARY OF THE INVENTION

These and other objects are achieved according to the present invention. The present invention is illustrated in an environment of a video tape recorder/playback device wherein encoded video information, recorded on tracks of a video tape, can be played back at normal or trick mode, i.e., n×normal, playback speeds. To facilitate trick mode forward or reverse playback, a storage layer stream is provided for encapsulating the compressed video and a format is provided for physically storing the storage stream on a video tape. Tracking of the storage layer stream is also accommodated during trick mode play back. Furthermore, additional replica information is generated during recording, which additional information is used for trick mode playback.

I. Storage Layer Stream/Tape Format

According to an embodiment, the storage stream layer supports a higher rate bitstream than is necessary to encode and decode the video (and associated audio and data) and the tape format has more space than is necessary to store such compressed video and audio. This excess storage and bandwidth capacity is used for storing and transmitting additional information, called trick mode data, which is not used in normal speed playback. Illustratively, in the case that the video information is encoded as per the MPEG II standard, the additional information includes DC and some AC coefficients of each block of I pictures of the encoded video stream.

The trick mode data is recorded in specially designated portions of the tracks of the video tape. These tracks and track portions are chosen so that the heads of the VTR can easily lock on to those portions of the track for specific values of n in an n×normal speed playback, wherein the tape is transported relative to the rotation of the heads at approximately n×the normal relative playback speed. In particular, the following information is known regarding the deviation of the angle of the scan of the playback heads during an n×normal speed playback:

$$s = \frac{n \cdot 2 \cdot T_p}{\sin\theta_a} \quad (1a)$$

$$\theta_f = \arcsin\left(\frac{s \cdot \sin\theta_t}{\phi_s \cdot \pi}\right) - (\theta_a - \theta_t) \quad (1b)$$

$$\theta_r = \theta_a - \arctan\left(\frac{\phi_s \cdot \pi \cdot \sin\theta_t}{s + \phi_s \cdot \pi \cdot \cos\theta_t}\right) \quad (1c)$$

where s is a parameter used in computing equations (1b)–(1c)

$\theta_f$ is the fast forward scanning deviation angle $\theta_r$ is the fast reverse scanning deviation angle $T_p$ is the track pitch or width $\theta_a$ is the recording track angle $\theta_t$ is the drum head lead in angle, and $\phi_s$ is the drum diameter.

Knowing the deviation angle $\theta_f$ or $\theta_r$, and n, it is possible to overlay ideal scan paths of the heads over tracks prerecorded at normal speed. Boundaries delineating an acceptable scan range are then overlaid onto the pre-reordered tracks in the vicinity of the ideal scan paths. Portions of the tracks which lie within these boundaries are then allocated to storing the trick mode data.

II. Tracking During Trick Mode Playback

Illustratively, the tape can be formatted so that trick mode data is recorded at predetermined portions of the tracks relative to an ideal oblique scan path of the playback heads during a particular trick mode playback. According to an embodiment, the heads scan the predetermined track portions in which the trick mode data is stored. To that end, sync words and identification codes are regularly interleaved with the trick mode data in the predetermined track portions containing the trick mode data. The identification codes stored in the predetermined portions are unique to the particular trick mode (i.e., the multiple n of the normal playback speed and direction).

An illustrative apparatus for tracking includes a standard definition video cassette recorder (SD VCR), a sync word detection and matched identification code counter circuit and a two-stage tracking circuit. The SD VCR includes a servo speed control circuit which controls the speed of a capstan servo that transports the tape. The SD VCR also has a scanner assembly that responds to the speed of the capstan servo for rotating the heads at an appropriate speed relative to the tape transport speed. In practice, the VCR drum speed is generally held constant, with only the tape transport speed being changed during trick mode playback. Furthermore, the SD VCR has a pick-up signal sampling and detection circuit which receives a data signal reproduced by the scanner assembly and, amongst other things, outputs a signal indicative of the frequency at which ATF words are reproduced from the tape. The sync word detection and matched identification code counter circuit also receives the data signal outputted by the scanner assembly This circuit detects sync words and accompanying identification codes in the data signal and outputs a signal indicative of the count of the identification codes matching the currently utilized trick mode. The two stage tracking circuit receives the count signal and the ATF frequency signal and outputs a signal to the servo speed control circuit for adjusting the relative tape transport and drum rotation speeds and for aligning the scanning of the heads to the desired scan path.

Illustratively, the tracking is achieved in two stages, namely, a searching stage and a tracking stage. Initially the servo speed control circuit attempts to accelerate the tape to a target speed $V_t$ which is appropriate for the trick mode being utilized, i.e., for the multiple n of the normal playback speed. For example, the tape transport speed can be set to n times the normal playback speed $V_1$ less a predetermined speed difference $\Delta V$ ($V_t=nV_1-\Delta V$). Then, the two stage tracking circuit enters the searching stage. Two different embodiments are illustrated for performing the searching stage.

According to a first embodiment, the two stage tracking circuit compares the count of the reproduced identification codes $C_m$, during a current interval m, to a count of the reproduced identification codes $C_{m-1}$ in a previous interval m−1. If the difference between the previous count $C_{m-1}$ and the current count $C_m$ exceeds a target count difference T, ($C_{m-1}-C_m>T$), the two stage tracking circuit changes the speed difference $\Delta V$ by a predetermined amount (e.g., $\Delta V=-\Delta V/2$). The two stage tracking circuit then changes the target tape transport speed $V_t$ by the speed difference (e.g., $V_t=nV_1-\Delta V$) and outputs a signal indicating the new target speed to the servo speed control circuit. The servo speed control circuit attempts to change the tape transport speed to meet the new target speed $V_t$. On the next interval, the two stage tracking circuit once again subtracts the current count $C_m$ from the previous count $C_{m-1}$.

If, on the other hand, the difference between the previous count $C_{m-1}$ and the current count $C_m$ is less than or equal to the target count difference T, the current count $C_m$ is then compared to a target count C. If the current count $C_m$ is not equal to the target count C then the above-steps are repeated wherein the identification codes are once again counted and compared to the previous count. If, on the other hand, the current count $C_m$ equals the target count C, then the apparatus enters the tracking stage.

According to a second embodiment, the two-stage tracking circuit includes a modified zero crossing phase locked loop (ZCR PLL). Illustratively, during the searching stage, the ZCR PLL uses the following formula to compute a speed difference $\Delta V_{m+1}$ for the next scan m+1:

$$\Delta V_{m+1} = k \cdot f(C_m - C_{m-1}) \cdot (C - C_m) \cdot f(\Delta V_m) \cdot V_1 \quad (2)$$

where:

$$f(x) = \begin{cases} 1, & x > 0 \\ -1, & x \leq 0 \end{cases} \quad (3)$$

$\Delta V_m$ is the currently used speed difference $\Delta V_{m+1}$ is the speed difference for the next interval k is a feedback scaling constant for stabilizing the ZCR PLL During each interval of the searching stage, the current count of reproduced, matching identification codes $C_m$ (for the current interval m) is stored in a one interval delay circuit. A subtractor subtracts the current count $C_m$ from the previous count $C_{m-1}$ of reproduced, matching identification codes (for the previous interval m-1), outputted by the delay circuit. This difference is inputted to a polarity circuit, which outputs a sign indicating whether the difference is greater than zero or less than or equal to zero. A second subtractor is also provided for subtracting the current count $C_m$ from the target count C. This difference is multiplied by the sign outputted from the polarity circuit in a multiplier. The product thus computed is multiplied by the sign of the speed differential $\Delta V_m$ of the current interval m, which sign is outputted from a second polarity circuit. The product from the second multiplier is then inputted to a speed difference determining circuit. Illustratively, the speed difference determining circuit multiplies the product by the normal tape transport speed $V_1$ and a constant k to produce the speed adjustment $\Delta V_{m+1}$ for the next interval m+1. Illustratively, the constant k is chosen to be large enough to cause the ZCR PLL to quickly lock the scanning on the correct scan path without introducing instability into the system. The two-stage tracking circuit then adjusts the target speed $V_t$ by the deviation $\Delta V_{m+1}$ and outputs the adjusted target speed to the servo speed control circuit. The servo speed control circuit then adjusts the speed of the tape transport to attempt to achieve the adjusted target speed $V_t$. The ZCR PLL is active in the searching stage until the current count $C_m$ equals the target count C. At that point, the circuit enters the tracking stage.

In the tracking stage, the scanner assembly reproduces a data signal containing ATF words from the tape and the pick-up signal sampling and detection circuit generates a signal indicating the frequency of occurrence of the ATF words. Furthermore, the matching identification code counter circuit outputs a signal indicating the count of the matched identification codes $C_m$ in the reproduced data signal each interval m. These signals are fed to the two stage tracking circuit. The two-stage tracking circuit outputs a signal to the servo speed control circuit to adjust the tape transport speed in accordance with the ATF frequency signal. The two stage tracking circuit also compares the count of the identification codes $C_m$ to the target count C. If the count of reproduced identification codes equals the target count ($C_m = C$), then the heads are presumed to be locked on the correct scan path and the steps of the tracking stage are repeated indefinitely while the nxnormal speed advance is maintained. If the two counts are different, then the two stage tracking circuit changes the speed difference $\Delta V$ by a predetermined amount (e.g., $\Delta V = -2\Delta V$) and the steps of the searching stage are executed again.

III. Trick Mode Data Generation

According to an embodiment, the trick mode data are generated from the encoded video signal and recorded on the appropriate tracks and portions thereof. Illustratively, the DC coefficients of each block of selected I pictures are identified and replicated, i.e., recorded in the predetermined track portions. In addition, selected low frequency AC coefficients for each block may be replicated in the predetermined track portions. The selected low frequency AC coefficients are the first non-zero coefficients found in zig-zag scan order from the DC coefficient in each (8×8) intrablock. According to one embodiment, for each block of an I picture, each AC coefficient is examined in a zig-zag scan order from the DC coefficient until the first non-zero AC coefficient is detected. The zero AC coefficients (if any) and non-zero AC coefficient thus examined in zig-zag scan order form a run or sequence of AC coefficients. The non-zero AC coefficient is compared to a threshold $AC_T$. If it exceeds the threshold $AC_T$, the run of AC coefficients in that block will be extracted and concatenated with an end of block (EOB) code. Otherwise the run of coefficients is discarded. The retained runs of AC coefficients are then stored along with the DC coefficients in the predetermined track portions of the tape. During trick mode playback, the original block of pixels is decoded using only the DC coefficient, and available AC coefficients reproduced from the predetermined track portions. While such a decoded block of pixels has a lower fidelity than a block decoded during normal speed playback, the reproduced block has a fidelity which is acceptable for fast forward or fast reverse scan of the tape.

Conclusion

In short, the present invention provides a storage layer stream for encapsulating the compressed video and a format for physically storing the storage stream on a video tape, including trick mode data. The present invention also provides for tracking the storage layer stream during trick mode playback, in particular, for tracking the track portions on which the trick mode data is stored. Furthermore, the present invention provides for generating the trick mode data during recording. The present invention therefore provides a feasible and simple solution for providing trick mode playback of compressed video in a digital VTR.

BRIEF DESCRIPTION OF THE DRAWINGS

FIG. 11 illustrates an apparatus according to an embodiment of the present invention for tracking a tape formatted as illustrated in FIGS. 7, 8 and 9.

FIG. 19 graphically depicts a comparison between the direct searching stage technique and the ZCR PLL searching stage technique.

FIG. 20 illustrates display schedules for different GOP's and different trick mode playback speeds.

DETAILED DESCRIPTION OF THE INVENTION

I. Tape Format

According to the invention, it is presumed that less than all of the portions of the tracks of the tape are needed to record a video signal. For instance, using a 25 M bit/sec storage layer/tape format to record a 19.2 M bit/sec ATV video-audio signal utilizes less than 80% of the tape. This means that 20% of the tape storage capacity may be used for storing other data. According to the invention, at least some excess tape storage capacity is allocated to storing data useful for decoding and presenting a video signal during trick mode playback, i.e. n×normal speed forward and/or reverse playback. However, the allocation of excess tape storage capacity is not arbitrary; rather, the formatting of the trick mode data into the excess storage capacity of the tape tracks is selected in accordance with the scanning of the heads during trick mode playback.

Figure 1:
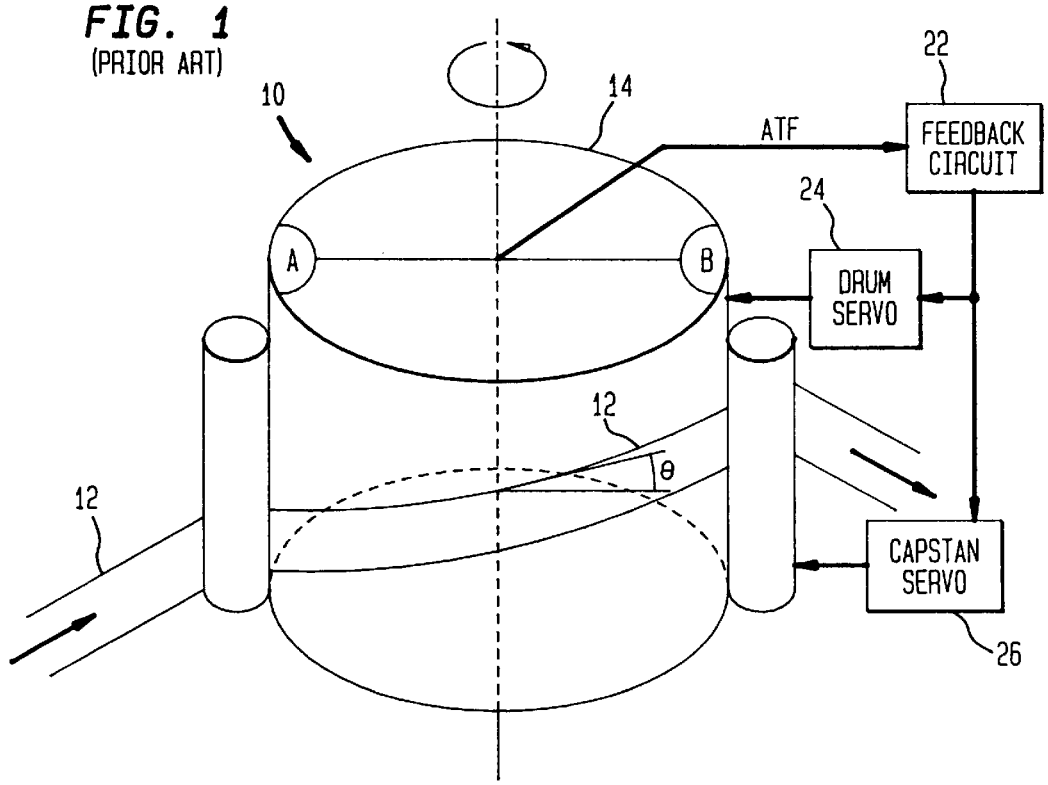
FIG. 1 depicts a conventional rotary drum and tape transport assembly.
Figure 2:
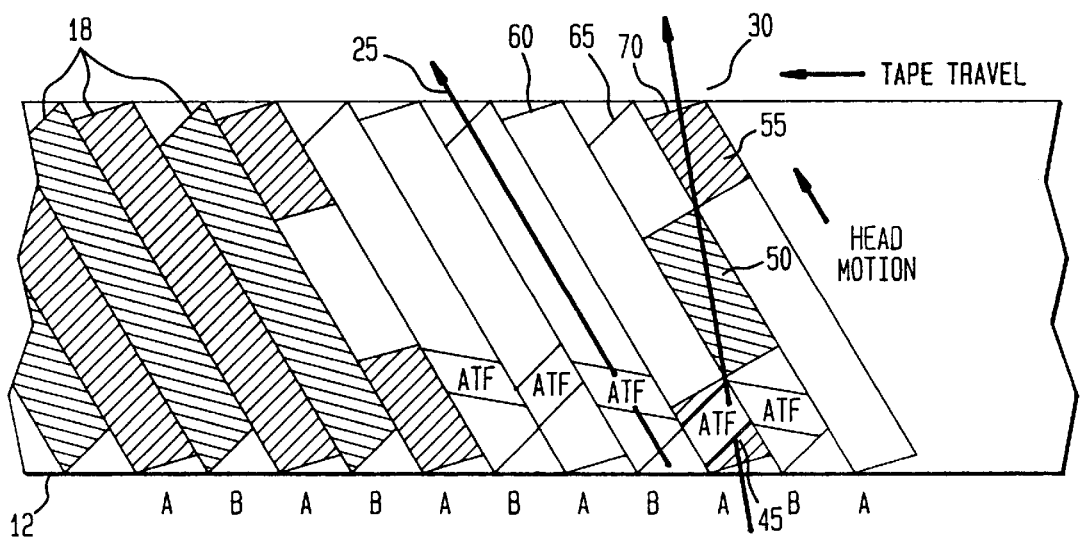
FIG. 2 illustrates the conventional scanning of the heads of the rotary drum over tracks of the tape transported in the assembly of FIG. 1.
Figure 3:
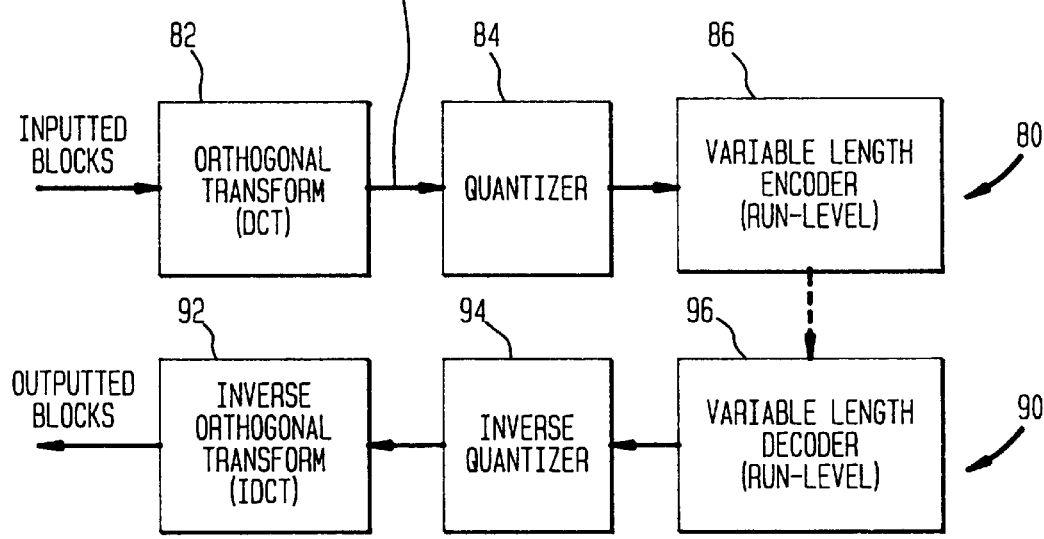
FIG. 3 illustrates a conventional spatial encoder and decoder.
Figure 4:
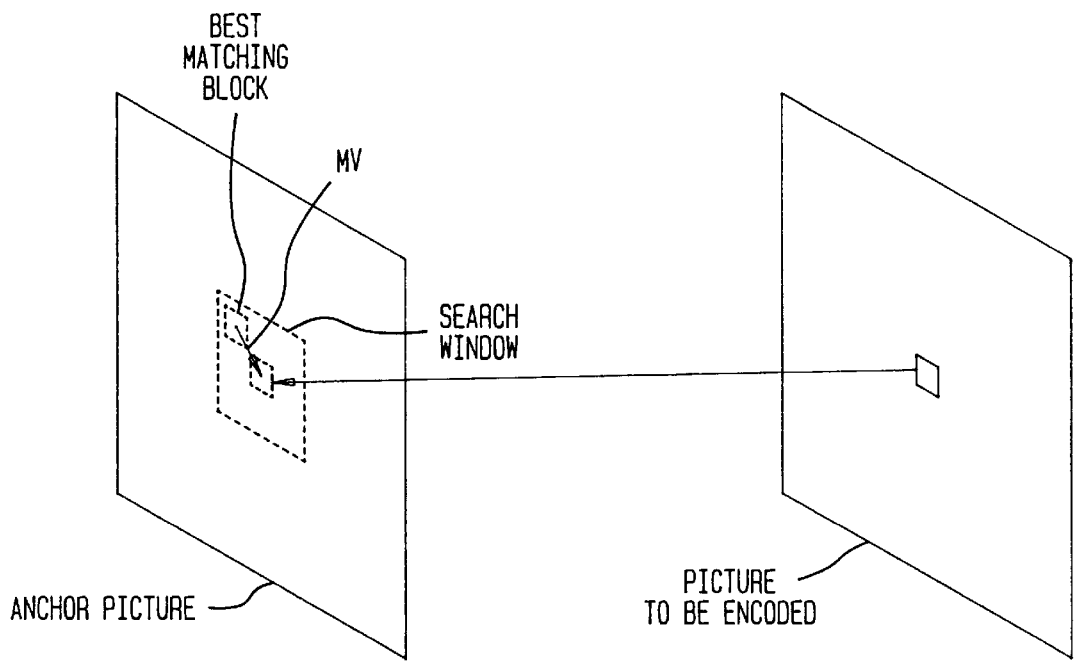
FIG. 4 illustrates a conventional block matching process for temporally encoding pictures.
Figure 5:
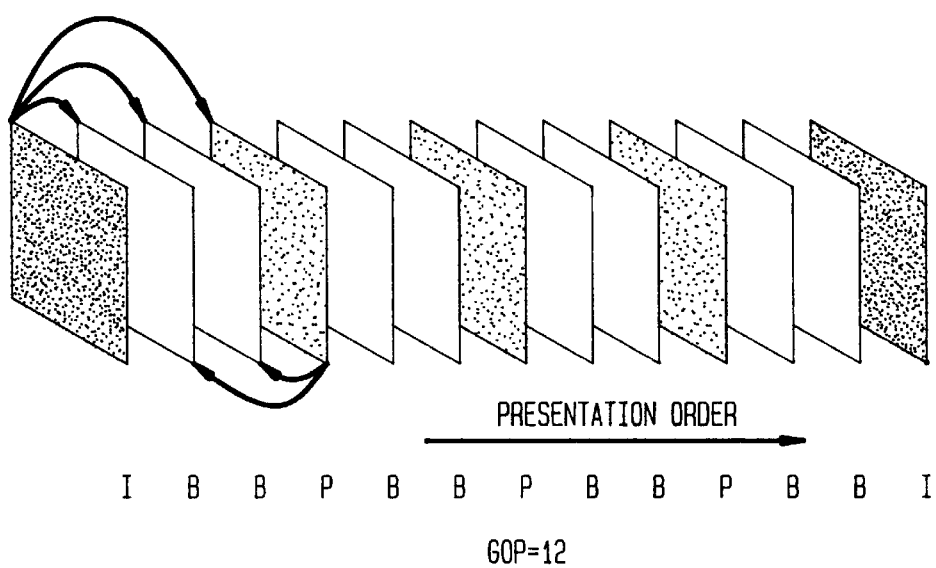
FIG. 5 illustrates the dependence of P and B inter coded pictures on anchor pictures.
Figure 6:
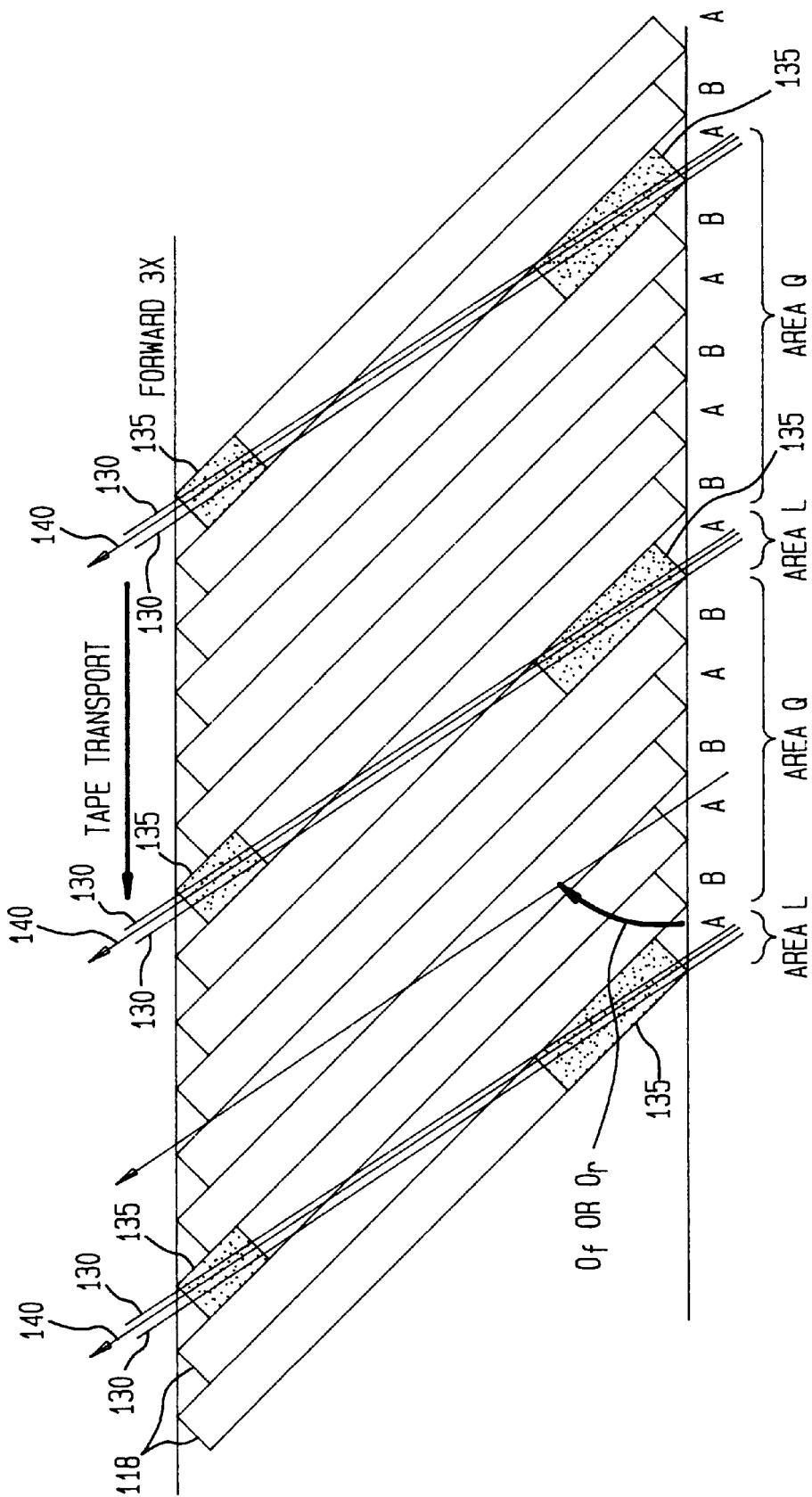
FIG. 6 illustrates a trick mode scan path according to the present invention.

FIG. 6 illustrates a tape 112 with tracks 118 recorded thereon at normal speed. As mentioned above, the angle of each track 118 depends on the relative speed of rotation of the heads A,B and the transport speed of the tape 112. The lines 130 illustrate the boundaries of areas L. In between areas L are areas Q. During trick mode playback, e.g., 3×normal speed playback, the heads A,B can be controlled (as described below) to scan the tape 112 only within the areas L. Thus, the tape format is selected so that trick mode data is recorded onto portions of tracks 118 which lie in the areas L. For example, the trick mode data may be placed in shaded areas 135.

In order to determine the areas L, it is necessary to determine the deviation angle of the scanning of the heads A and B during each trick mode, i.e., for 3×forward, 3×reverse, 9×forward, 9×reverse, etc. The deviation angles $\theta_f(n)$ (deviation for forward playback at n×normal speed) and $\theta_r(n)$ (deviation for reverse playback at n×normal speed) for a two head VTR are given by:

$$s = \frac{n \cdot 2 \cdot T_p}{\sin\theta_a} \quad (1a)$$

$$\theta_f = \arcsin\left(\frac{s \cdot \sin\theta_t}{\phi_s \cdot \pi}\right) - (\theta_a - \theta_t) \quad (1b)$$

$$\theta_r = \theta_a - \arctan\left(\frac{\phi_s \cdot \pi \cdot \sin\theta_t}{s + \phi_s \cdot \pi \cdot \cos\theta_t}\right) \quad (1c)$$

where s is a parameter used in computing equations (1b)–(1c)
$\theta_f$ is the fast forward scanning deviation angle
$\theta_r$ is the fast reverse scanning deviation angle
$T_p$ is the track pitch or width
$\theta_a$ is the recording track angle
$\theta_t$ is the drum head lead in angle, and
$\phi_s$ is the drum diameter.

Figure 7:
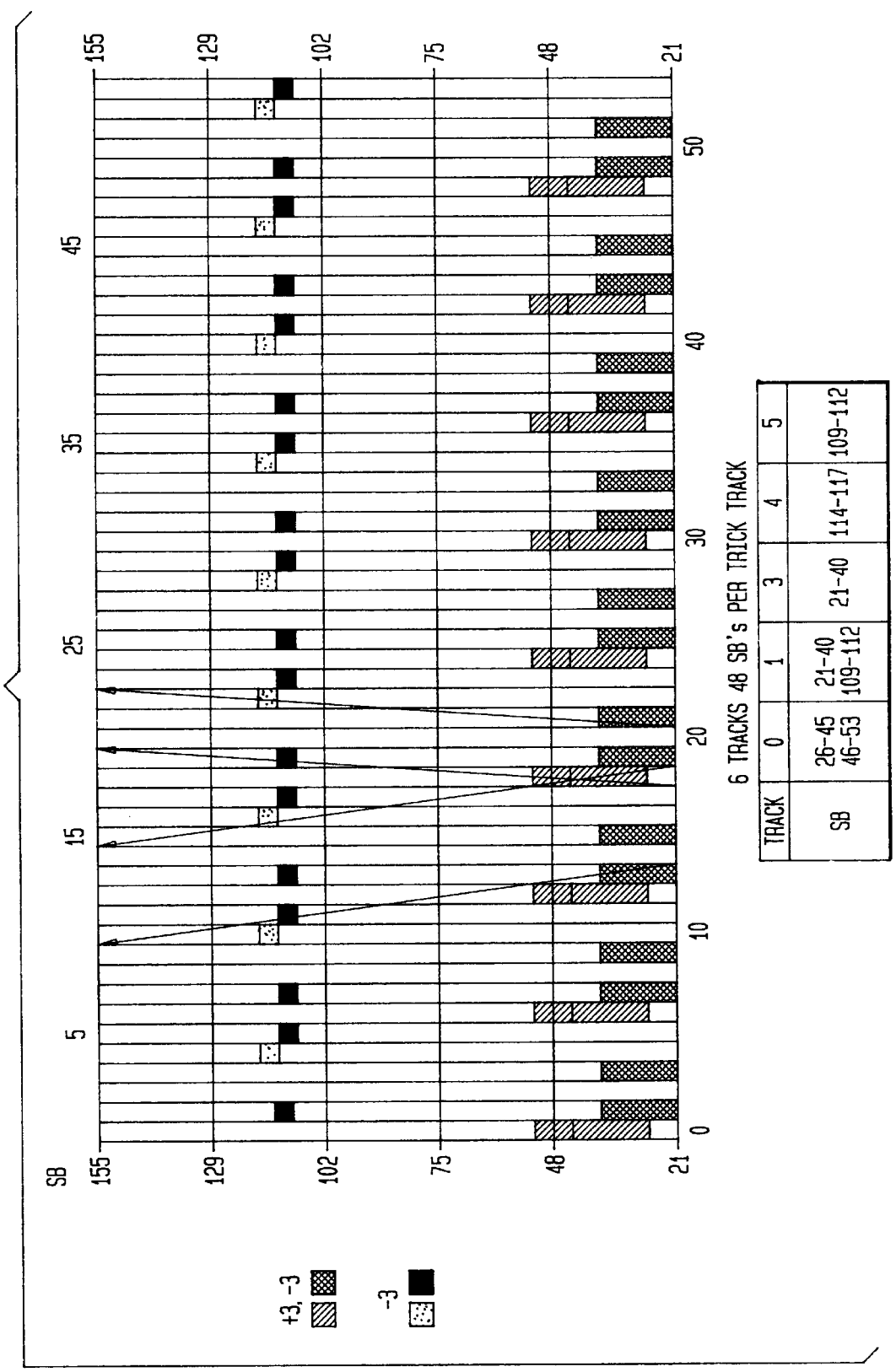
FIGS. 7, 8 and 9 illustrate tape formats for enabling 3×, 9× and 27×normal speed forward and reverse playback, respectively, according to an embodiment of the present invention.
Figure 8:
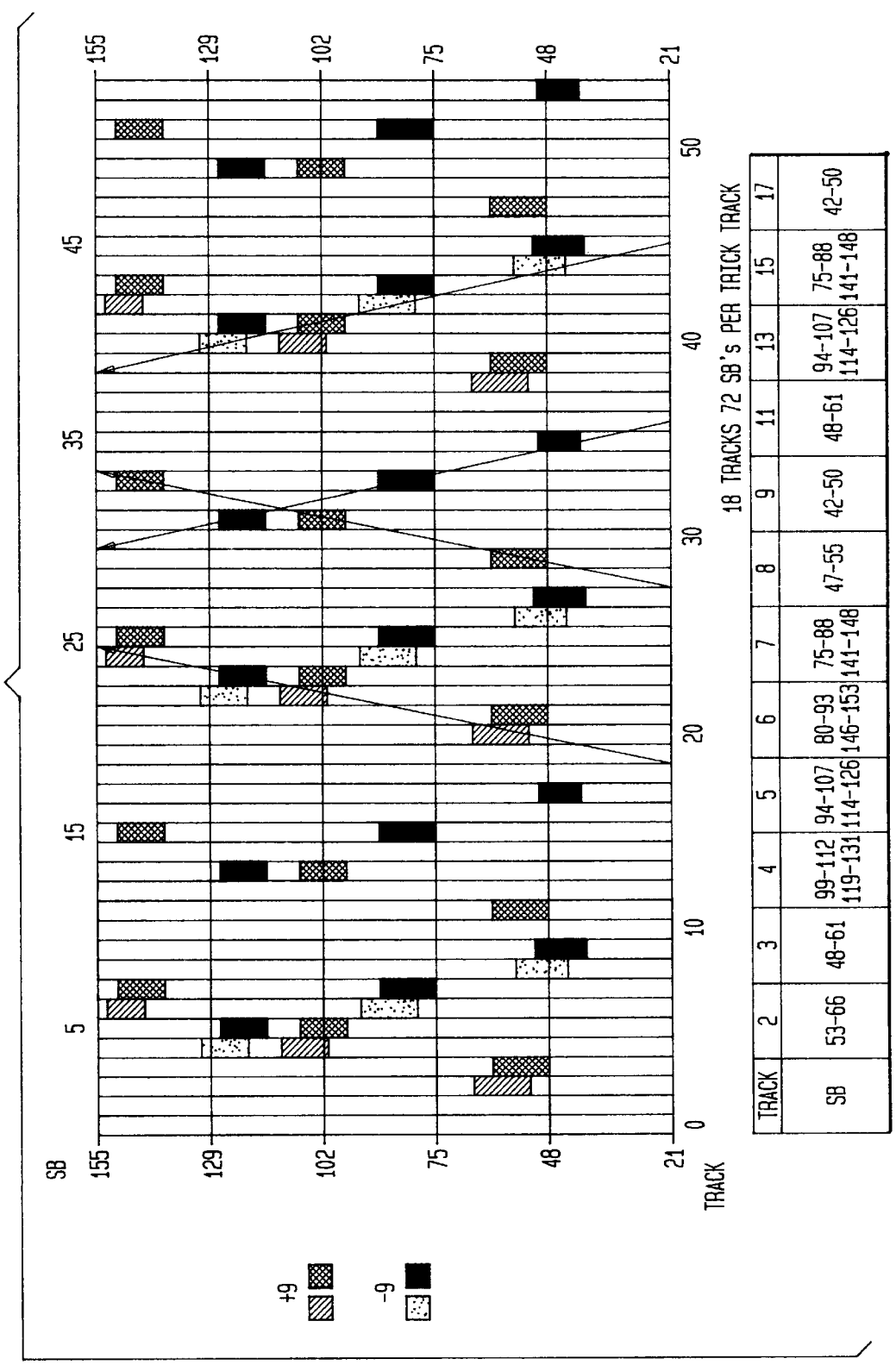
Figure 9:
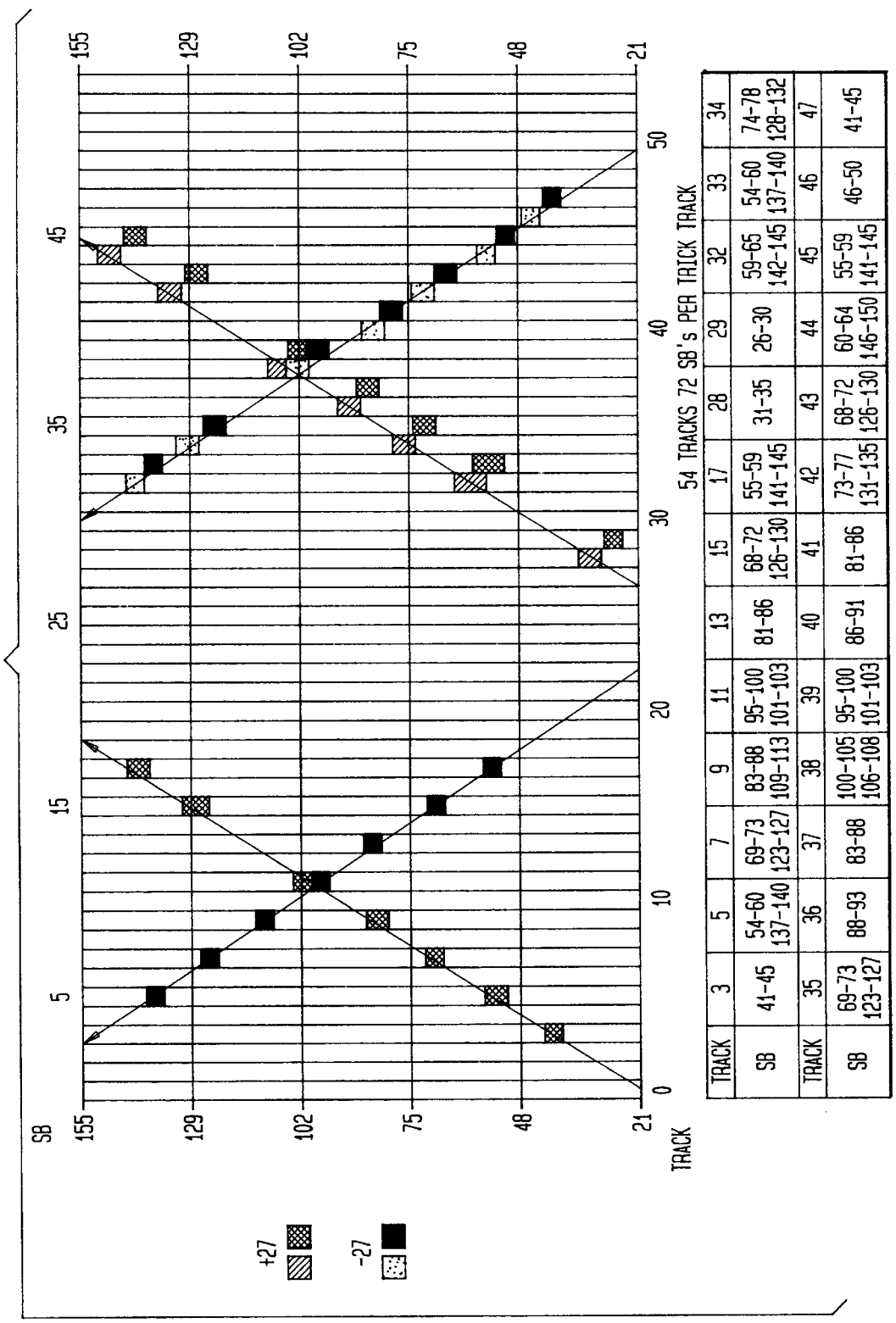

An ideal scan 140 is selected which crosses the tracks 118 at the deviation angle $\theta_r$ or $\theta_f$. Boundaries 130 are then selected on either side of the ideal scan 140 which delineate an acceptable and maintainable scan range. From the fixed ideal scan 140, the next ideal scan 140 is determined considering the tape speed at the selected trick mode speed. For instance, at a 3×normal (forward or reverse) speed, the second ideal scan 140 will start six tracks after the first ideal scan 140. After the boundaries 130 delineating area L are laid out, some portions of the tracks 118 which fall between the boundaries 130 are allocated to storing trick mode data. FIGS. 7, 8 and 9 illustrate the allocation of tape portions for storing trick mode data in 3×normal, 9×normal and 27×normal forward and reverse speeds. Data is illustratively stored on the tape tracks 118 in "sync blocks" where each sync block can store 77 bytes. Illustratively, 169 sync blocks are provided, but only sync blocks 21–155 may be used to store video data. (For purposes of convenience FIGS. 7, 8 and 9 show the sync blocks as being a rectangular array.) The allocation of sync blocks for trick mode data are also shown below each figure. For instance, for 3×normal forward or reverse playback, sync blocks 26–45 and 46–53 of track 0, sync blocks 21–40 and 109–112 of track 1 sync blocks 21–40 of track 3, sync blocks 114–117 of track 4 and sync blocks 109–112 of track 5 are allocated to storing trick mode data. It is possible to incorporate several trick mode data areas simultaneously on the same tape 112 so that a selection of trick mode playback options are available.

During recording, trick mode data are determined (as described below in section III). Thereafter, the data is illustratively combined with the original data at the storage layer to ensure that it is recorded at the correct track portions.

II. Tracking

Figure 10:
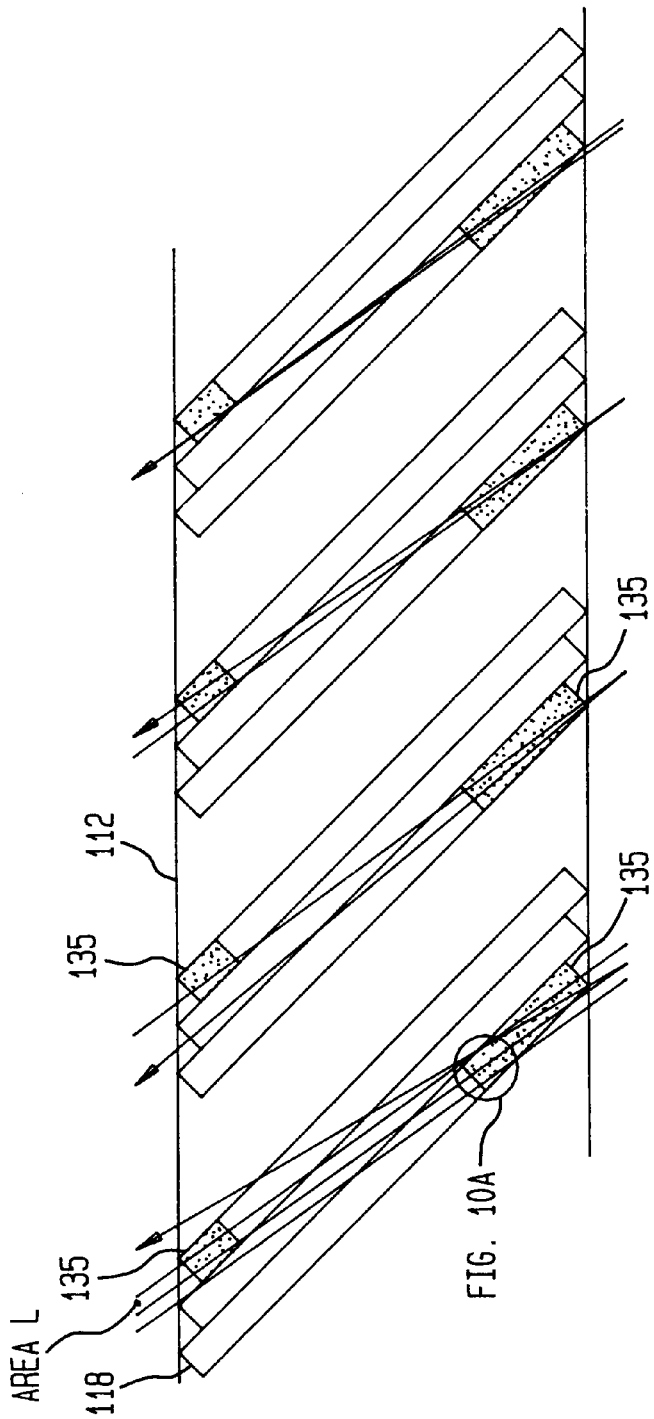
FIG. 10 illustrates the interleaving of sync words and identification codes with trick mode data in trick mode data areas of a tape, according to an embodiment of the present invention.
Figure 10A:
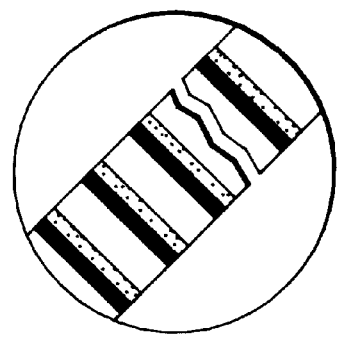

Given that the tape is formatted with trick mode data only within certain areas L (where L varies from trick mode to trick mode), it is necessary to lock the scanning of the heads onto the areas L. To that end, the data in each trick mode data area is organized in a particular fashion. More specifically, as shown in FIG. 10, sync words, identification codes and trick mode data are interleaved in each trick mode area as shown. The sync word is a predetermined sequence of bits. Illustratively, the sequence is selected such that it is unlikely to appear in the data section of the trick mode data area 135. The purpose of the sync word is to provide a reference point for locating an identification code on a track 118. The identification code is a predetermined sequence of bits that is fixed for a given trick mode. However, the identification code in a trick mode data area of one trick mode differs from the identification code in a trick mode data area of another different trick mode. The purpose of the identification code is two-fold. First, the identification code indicates that the portion of the tape being scanned is a trick mode data area. Second, the identification code identifies the trick mode to which the trick mode data area 135 corresponds. For instance, if both 3×normal forward playback and 9×normal forward playback were accommodated by the tape format, then separate trick mode data areas 135 must be provided for each trick mode. This is because the scanning of the heads A and B relative to the tracks 118 is different for each trick mode. Thus, during a particular trick mode it is important to lock the scanning of the heads on, and to reproduce the data from, only the correct trick mode data areas. The identification codes provide such a label for distinguishing each trick mode data area.

FIG. 11 illustrates an apparatus 200 for trick mode playback tracking. A standard definition video cassette recorder (SD VCR) 210 is shown including a servo speed control circuit 220. The servo speed control circuit controls the speed at which a capstan servo 230 transports the VCR tape. A scanner assembly 240, which includes a rotating drum with heads, maintains the drum speed constant. As the heads of the scanner assembly 240 scan the tape, they reproduce a data signal recorded thereon. The data signal is fed to a pick-up signal sampling and detection circuit 250 which detects each ATF word reproduced from the tape. The circuit 250 outputs from the SD VCR 210 to a two-stage processing circuit 270 a signal indicating the frequency at which the ATF word has been detected. For instance, the circuit 250 can output a pulse each time an ATF word is detected.

The data signal is also transmitted from the SD VCR 210 to a sync word detection and matching identification code counter circuit 260. The circuit 260 detects each reproduced sync word. Using each sync word as a reference point, the circuit 260 identifies the reproduced identification code following the sync word. The circuit 260 compares the reproduced identification codes to the predetermined identification code corresponding to the particular trick mode currently utilized. The circuit 260 outputs a signal indicative of the number of identification codes matching the currently utilized trick mode to the two-stage processing circuit 270. For instance, the circuit 260 can output a pulse each time a matching identification code is detected.

The two stage processing circuit 270 receives the ATF frequency signal and the identification count signal. Illustratively, the two-stage processing circuit 270 may be a simple microprocessor or a finite state automata constructed to provide the functions described below. In response to these two signals, the two stage processing circuit 270 feeds back a speed control signal to the servo speed control circuit 220 of the SD VCR 210. In response, the servo speed control circuit 220 adjusts the speed of the capstan servo 230 (which transports the tape) relative to the speed of the scanner assembly 240 (which rotates the heads).

Illustratively, the apparatus 200 tracks the desired scan path using two stages, namely, a searching stage and a tracking stage. Initially the tape transport is accelerated to an initial speed. The apparatus then enters the searching stage during which the apparatus attempts to adjust the tape transport speed to the correct speed for scanning on the desired scan path and to lock the scan of the heads onto the desired scan path. Once this is achieved, the apparatus enters the tracking stage during which the apparatus 200 attempts to maintain the scanning of the heads on the desired scan path. If the scan of the heads deviates from the desired scan path then the apparatus once again enters the searching stage.

Figure 12:
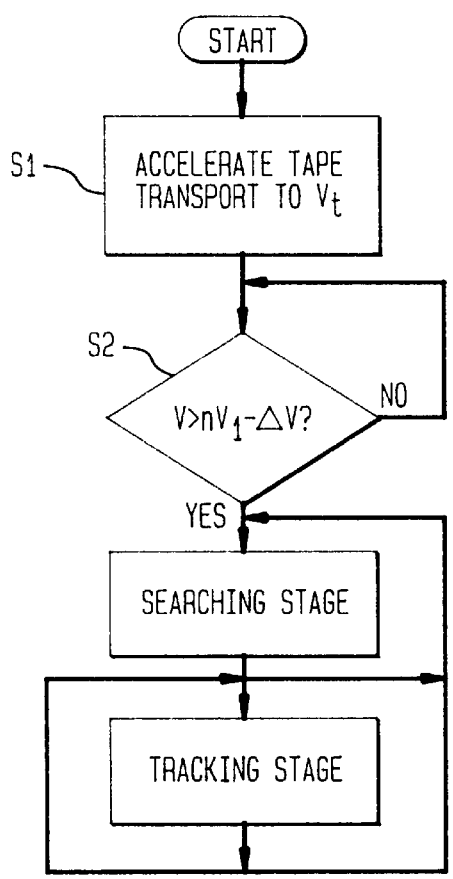
FIG. 12 is a flowchart which schematically illustrates a process executed by the apparatus of FIG. 11.

The operation of the apparatus 200 is schematically illustrated by the flowchart depicted in FIG. 12. When a particular trick mode is initiated, for instance by pressing a forward or reverse search scan button of the SD VCR 210 (not shown), the servo speed control circuit 220 outputs a signal to the capstan servo 230 for accelerating the tape transport speed to a particular speed $V_t$ in step S1. Illustratively, the speed control servo 220 initially outputs a signal to the capstan servo 230 for accelerating the tape to a speed $V_t$ which is higher than the desired tape transport speed for the trick mode. For instance, if the transport speed for normal speed playback is $V_1$, and the desired trick mode transport speed for n×normal speed playback is $n \times V_1$, then $V_t = (n+0.5) \times V_1$. While the tape transport accelerates, the servo speed control circuit continually executes step S2. In step S2, the servo speed control circuit 220 monitors the actual speed of the tape V and determines whether the actual speed of the tape transport V is within a small speed difference $\Delta V$ of the desired trick mode transport speed $nV_1$ (i.e., if $V > nV_1 - \Delta V$). If not, execution returns to step S1. If $V > nV_1 - \Delta V$, then the apparatus enters the searching stage.

A. Searching Stage

Two searching stage techniques are described below, namely, a direct technique and a zero crossing phase locked loop technique. In both techniques, the count of matching identification codes $C_m$ reproduced in a current interval m is compared to the count of matching identification codes $C_{m-1}$ produced in a previous interval m−1. The difference between these two counts (in particular, which of the two counts is bigger) indicates whether or not the scanning of the heads is converging to, or diverging from, the desired scanning path (wherein the heads scan within the predetermined areas L). If the scan of the heads is diverging from the desired scanning path, then the tape transport speed must be adjusted in an opposite fashion to the previous adjustment. For instance, if the speed was previously increased then the speed must now be decreased in order to force the scanning of the heads to converge to the desired scanning path.

Direct Searching Stage Technique

Figure 13:
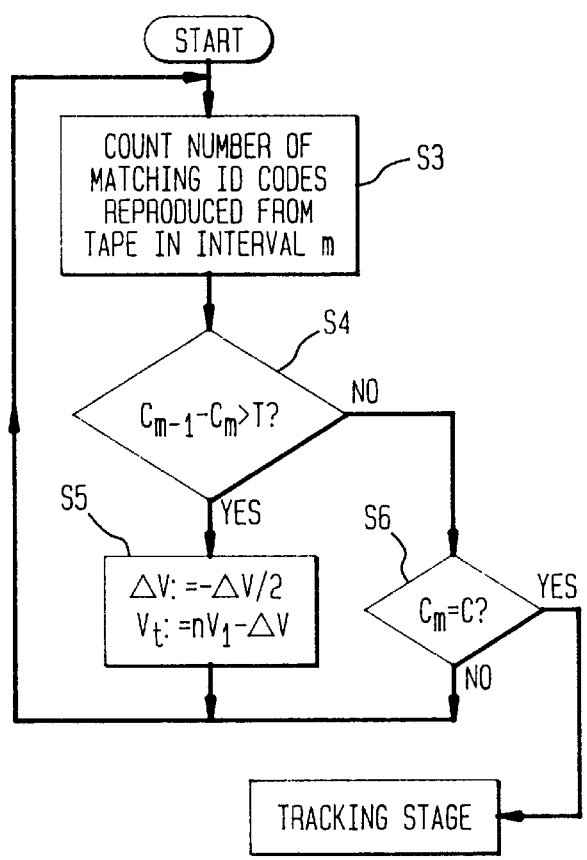
FIG. 13 illustrates an apparatus according to a second embodiment of the present invention for tracking a tape formatted as illustrated in FIGS. 7, 8 and 9.

FIG. 13 is a flowchart which schematically illustrates a searching stage process executed by the apparatus 200 during the searching stage. In step S3, the sync detection and identification code matching circuit 260 detects sync words and matches identification codes from the data signal reproduced from the tape. The two stage tracking circuit 270 also generates a current count $C_m$ in a current interval of time m of the number of detected matching identification codes. Next in Step S4, the two stage tracking circuit 270 determines whether the change in the number of detected matching identification codes between the current time interval m and the previous time interval m−1 is greater than some target change T (i.e., if $C_{m-1} - C_m > T$). By experimentation it has been shown that $C_m$ is apparently a quadratic concave function of the distance and angle deviation between the current scanning path and the desired scanning path (i.e., over the areas L). Thus, if $C_{m-1} - C_m > T$, then the head scan is diverging from, rather than converging to, the desired scanning path (aligned with the areas L). In such a case, step S5 is executed wherein the two stage tracking circuit 270 outputs a signal to the servo speed control circuit 220 for adjusting the tape transport speed. Specifically, the two stage tracking circuit 270 divides the speed deviation ΔV by a selectable constant C, where, illustratively, C=4, and reverses the sign of ΔV. The two stage tracking circuit 270 then changes the target speed $V_t$ to $nV_1 - \Delta V$. Execution then returns to step S3. Steps S3–S5 are thus indefinitely executed until the change in matching identification counts between the last interval m−1 and the current interval m is less than or equal to a target change T (i.e., $C_{m-1} - C_m \leq T$).

If in step S4, $C_{m-1} - C_m \leq T$, execution proceeds to step S6. In step S6, the two-stage tracking circuit 270 determines whether or not the matching identification code count of the current interval $C_m$ is equal to a target interval count C. If not, then execution returns to step S3. If $C_m = C$ then the scan of the heads is presumed to be initially aligned with the desired scan path (over the areas L) and the relative rotational speed of the heads to the transport speed of the tape is presumed to be correct for the particular selected trick mode. Thus, the apparatus 200 enters the tracking stage.

2. Zero Crossing Phase Locked Loop Searching Stage Technique

Figure 14:
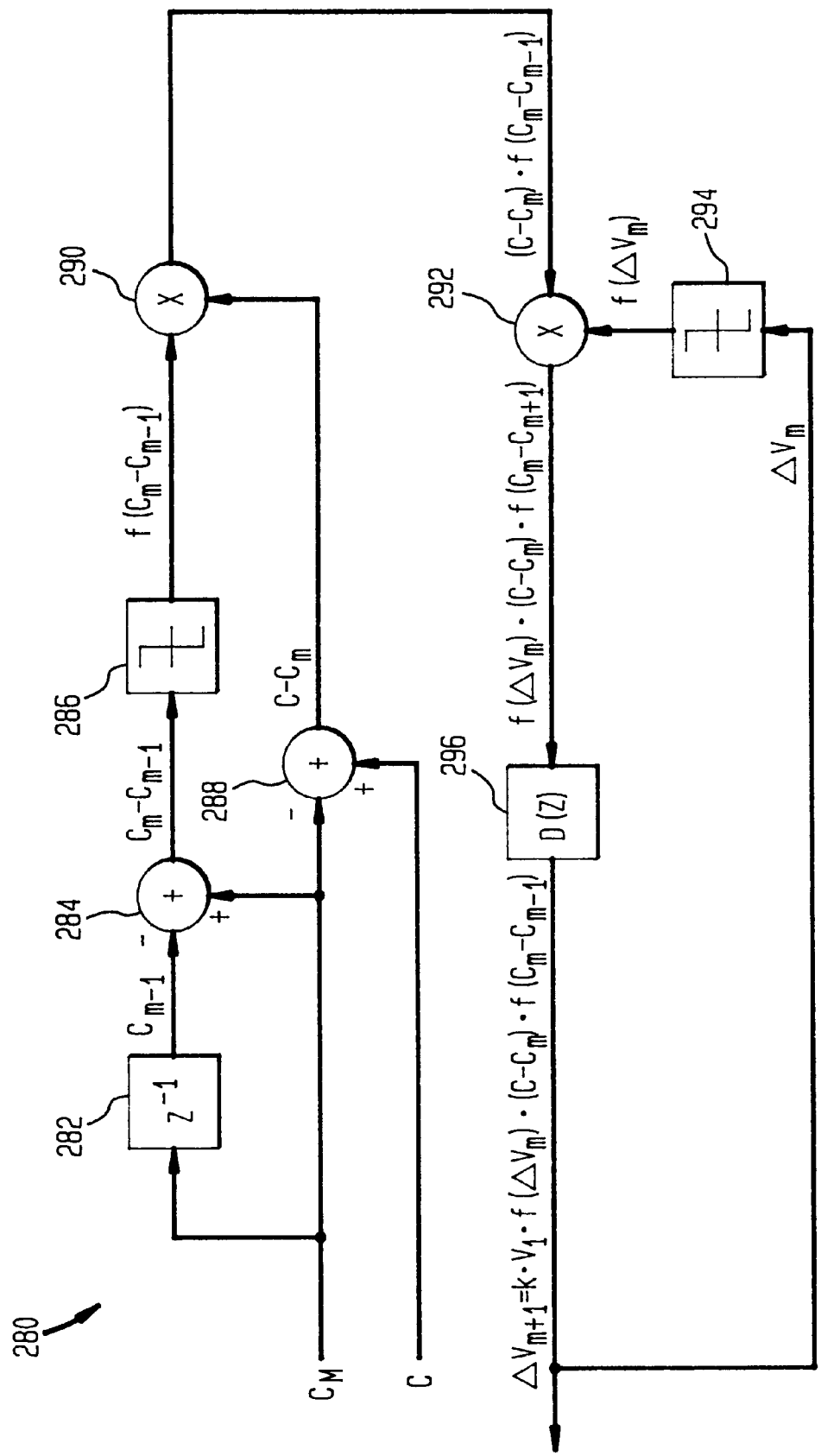
FIG. 14 illustrates a ZCR PLL circuit of the two-stage tracking circuit of the apparatus depicted in FIG. 11.

FIG. 14 shows a zero crossing phase-locked loop (ZCR PLL) 280 which is illustratively included in the two-stage tracking circuit 270. In the ZCR PLL technique, the ZCR PLL 280 operates during the searching stage to search for the desired scan path and relative tape transport-drum rotation speed. The ZCR PLL 280 continuously computes a speed difference $\Delta V_{m+1}$ to be used in adjusting the relative tape transport-drum rotation speed in the very next interval m+1. Illustratively, the ZCR PLL 280 determines $\Delta V_{m+1}$ from:

$$\Delta V_{m+1} = k \cdot f(C_m - C_{m-1}) \cdot (C - C_m) \cdot f(\Delta V_m) \cdot V_1 \quad (2)$$

where:

$$f(x) = \begin{cases} 1, & x > 0 \\ -1, & x \leq 0 \end{cases} \quad (3)$$

$\Delta V_m$ is the currently used speed difference, $\Delta V_{m+1}$ is the speed difference for the next interval, $C_m$ is the count of the matching identification codes reproduced in the current interval m, $C_{m-1}$ is the count of the matching identification codes reproduced in the previous interval m−1, C is a target count of matching identification codes, $V_1$ is the relative tape transport-drum rotation speed during normal speed playback, and k is a feedback scaling constant.

As shown, the ZCR PLL 280 has a one interval delay 282 which, during an interval m, receives the current count of detected identification codes $C_m$ and outputs the previous count of identification codes $C_{m-1}$ (detected during the previous interval m−1). The previous count $C_{m-1}$ is then subtracted from the current count $C_m$ in a subtractor 284. This difference is inputted to the polarity detection circuit 286 which evaluates the function f(x):

$$f(x) = \begin{cases} 1, & x > 0 \\ -1, & x \leq 0 \end{cases} \quad (3)$$

Thus, the polarity determination circuit 286 outputs a −1 or 1 depending on whether $C_m - C_{m-1}$ is greater than 0 or less than or equal to zero.

A subtractor 288 is provided which receives the target count C and the current count $C_m$ and which outputs the difference $C - C_m$. This difference $C - C_m$ and the result of the function f $(C_m - C_{m-1})$ outputted from the polarity detection circuit 286 are multiplied in a multiplier 290 which produces the product $(C - C_m) \cdot f(C_m - C_{m-1})$. The product $(C - C_m) \cdot f(C_m - C_{m-1})$ is outputted to a second multiplier 292 which also receives the output of a second polarity determination circuit 294. The second polarity determination circuit 294 outputs a −1 or 1 depending on the polarity of the current speed differential $\Delta V_m$. The product $f(C_m - C_{m-1}) \cdot (C - C_m) \cdot f(\Delta V_m)$ produced in the second multiplier 292 is outputted to a speed differential calculating circuit D(z) 296, which can be constructed using a generic digital filter. Illustratively, this circuit multiplies the product f $(C_m - C_{m-1}) \cdot (C - C_m) \cdot f(\Delta V_m)$ by the feedback constant k and the target normal playback relative tape transport-drum rotation speed $V_1$. The circuit 296 thus outputs the differential $\Delta V_{m+1} = k \cdot f(C_m - C_{m-1}) \cdot (C - C_m) \cdot f(\Delta V_m) \cdot V_1$ to be used in the next interval m+1. This differential is outputted to the second polarity determination circuit 294 (for use next interval). Furthermore, the two stage tracking circuit 270 computes the new target speed $V_t - \Delta V_{m+1}$ and outputs a signal indicating this new target speed $V_t$ to the servo speed control circuit 220. Illustratively, the feedback constant k is chosen to be large enough so that the two stage tracking circuit causes the heads to lock onto the desired scanning path as soon as possible but not so large as to introduce instability into the apparatus 200.

Illustratively, the two stage tracking circuit 270 uses the ZCR PLL circuit 280 in the searching stage until the current count $C_m$ equals the target count C (at which point $\Delta V_{m+1}$ will be zero). When this occurs, the apparatus 200 enters the tracking stage.

B. Tracking Stage

Figure 15:
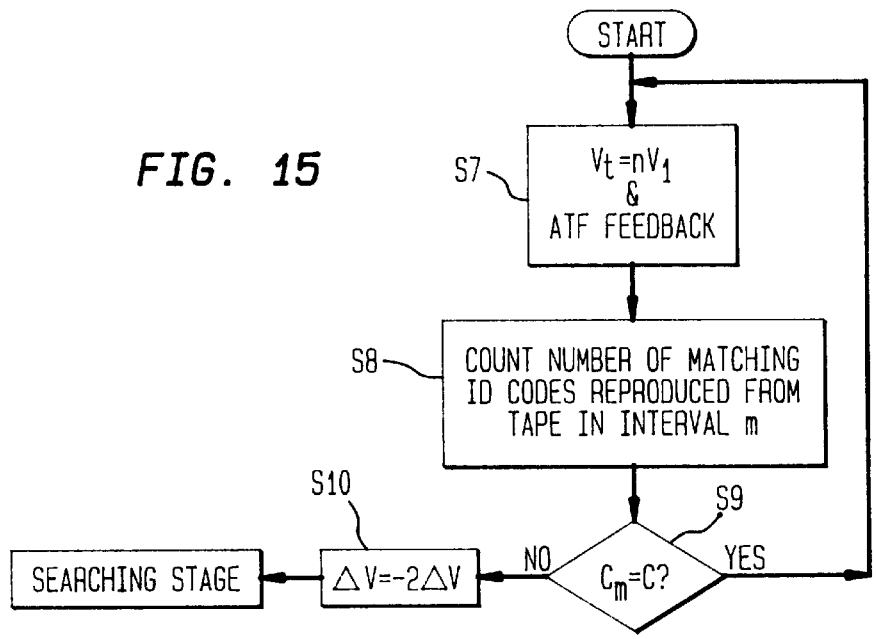
FIG. 15 is a flowchart which schematically illustrates a tracking stage executed by the apparatus of FIG. 11 according to the process of FIG. 12.

FIG. 15 is a flowchart which schematically illustrates the tracking process of FIG. 12. In step S7, the servo speed control circuit 220 attempts to maintain the capstan servo speed at $V_t = nV_1$. To that end, the two stage tracking 270 circuit receives the signal indicating the ATF frequency from the pick-up signal sampling and detection circuit 250. The two-stage tracking circuit 270 feeds back a signal to the servo speed control circuit 220 for adjusting, i.e., accelerating or decelerating, the relative tape transport-drum rotation target speed $V_t$. Such a speed adjustment is conventional and is not repeated here. In step S8, the two stage tracking circuit 270 counts the number of matching identification codes in the current interval $C_m$. In step S9, the two-stage tracking circuit 270 compares the current count $C_m$ to the target count C. If they are equal, then the head scan is aligned with the desired scanning path. In such a case, execution returns to step S7.

If $C_m$ does not equal C, then the head scan has deviated from the desired scanning path. In this case, execution proceeds to step S10 wherein the two-stage tracking circuit 270 doubles ΔV and changes its sign. The two-stage tracking circuit 270 transmits the new target speed $V_t = nV_1 - \Delta V$ to the servo speed control circuit 220. Thereafter, the apparatus 200 returns to the searching mode.

Figure 16A:
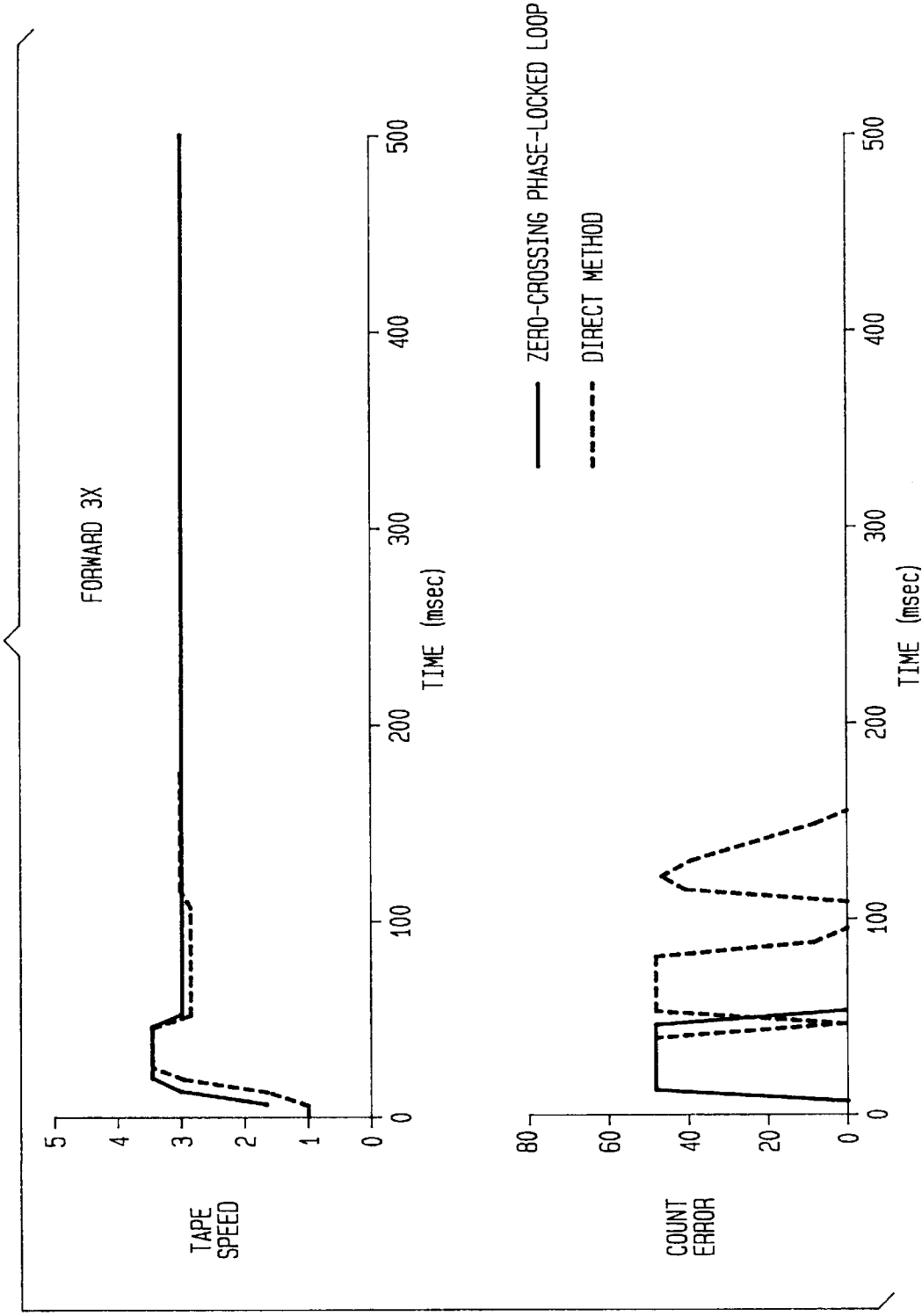
FIGS. 16–18 graphically demonstrate tracking results of the apparatus depicted in FIG. 11.
Figure 17A:
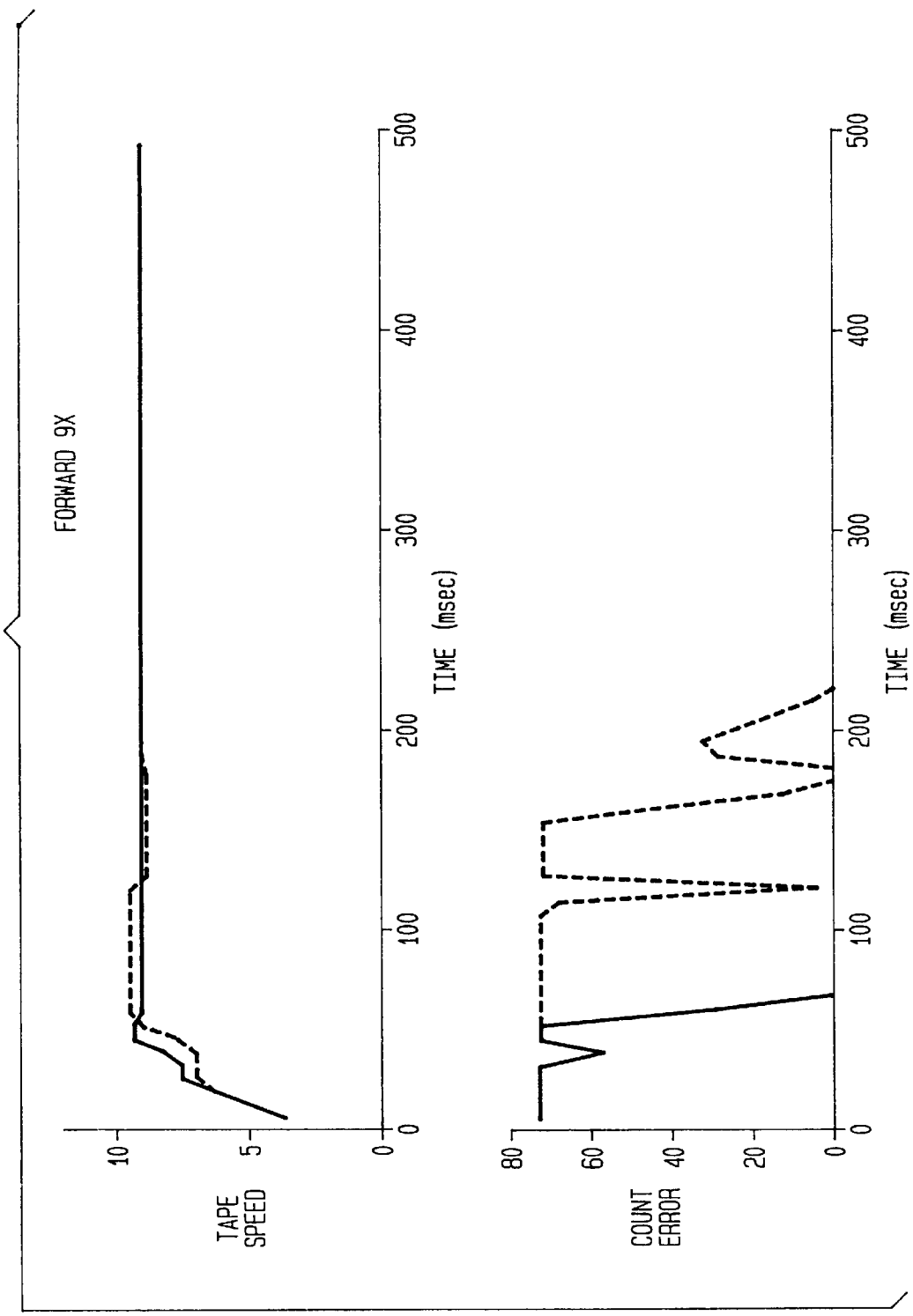
Figure 17B:
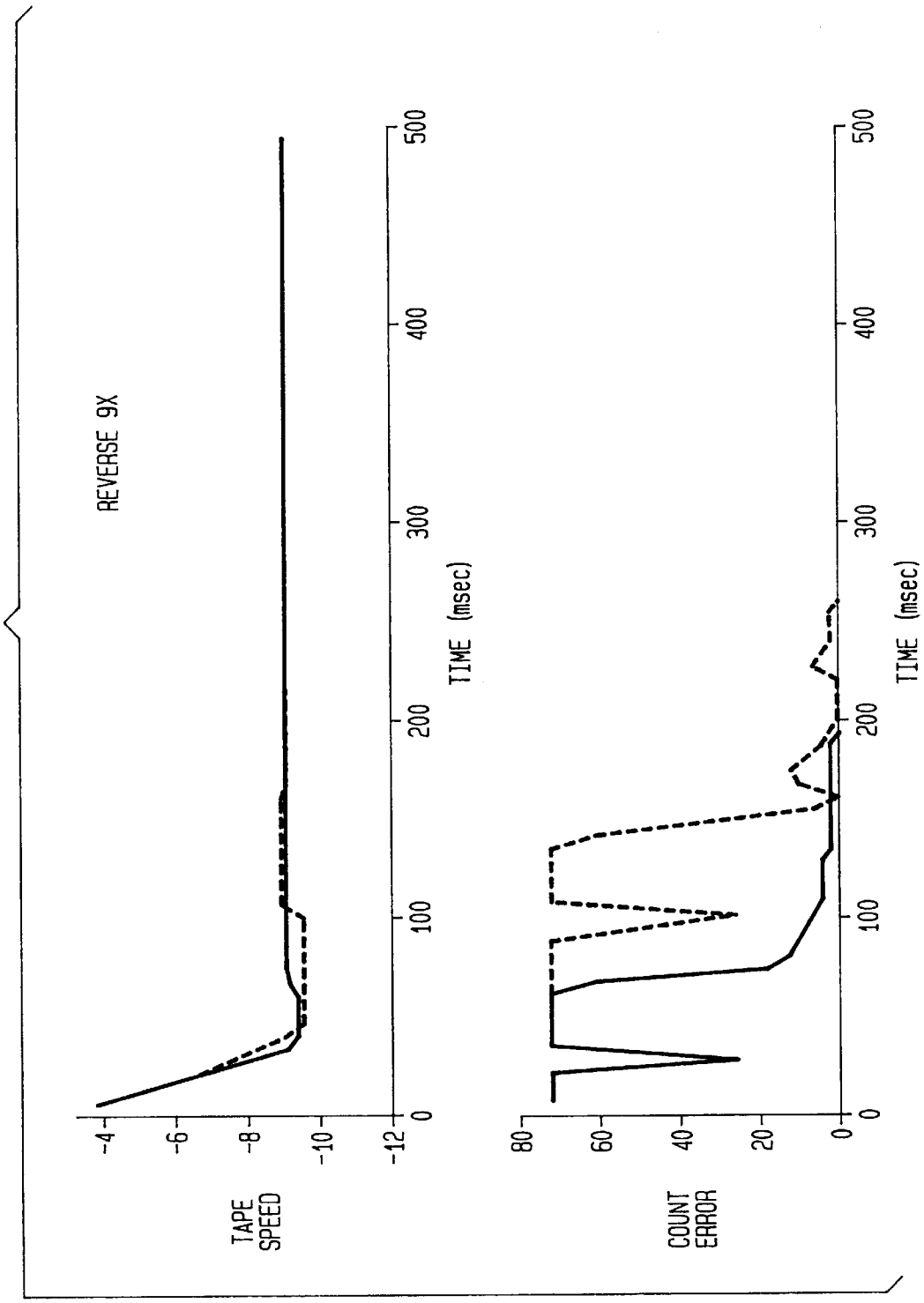
Figure 18A:
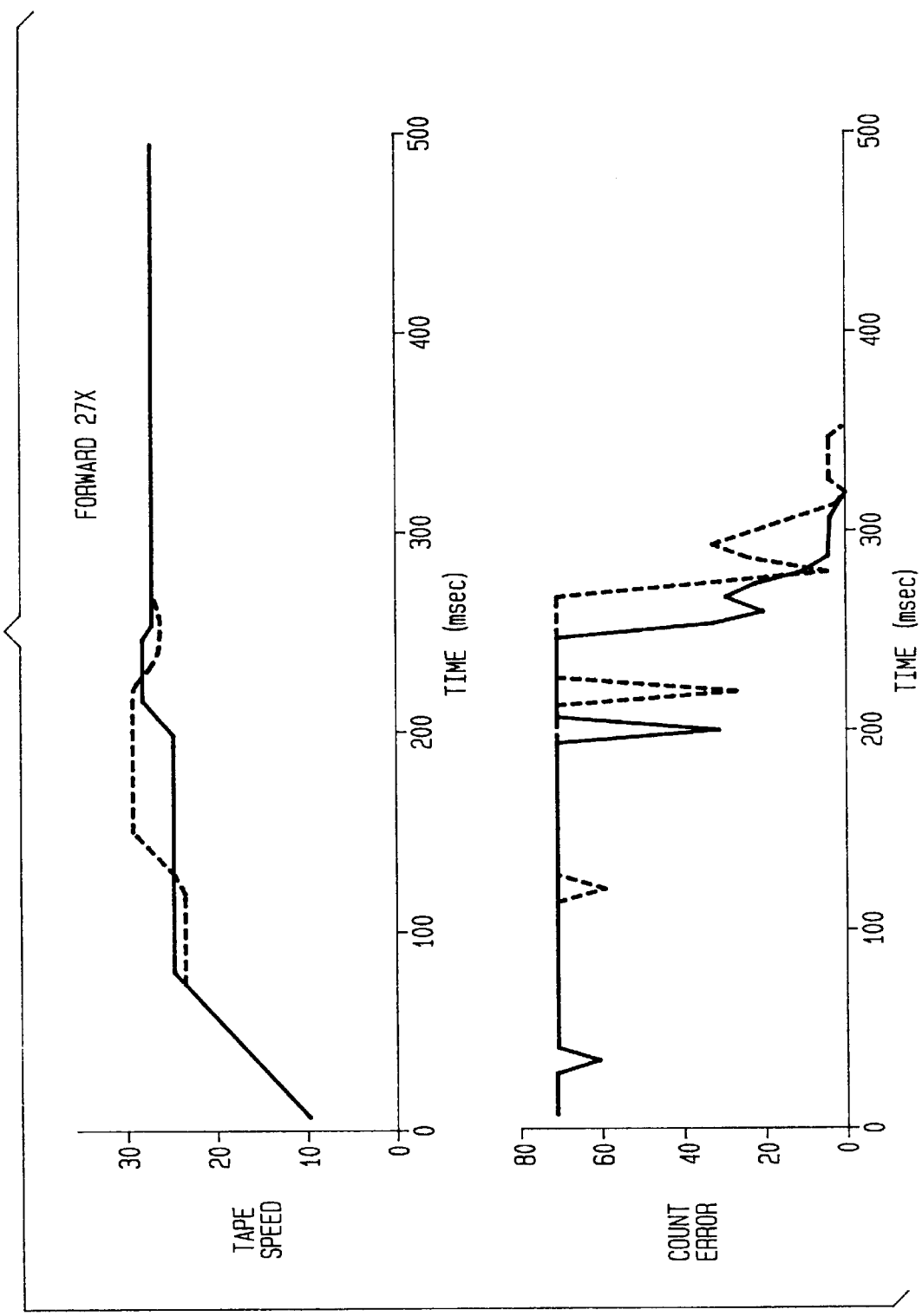
Figure 18B:
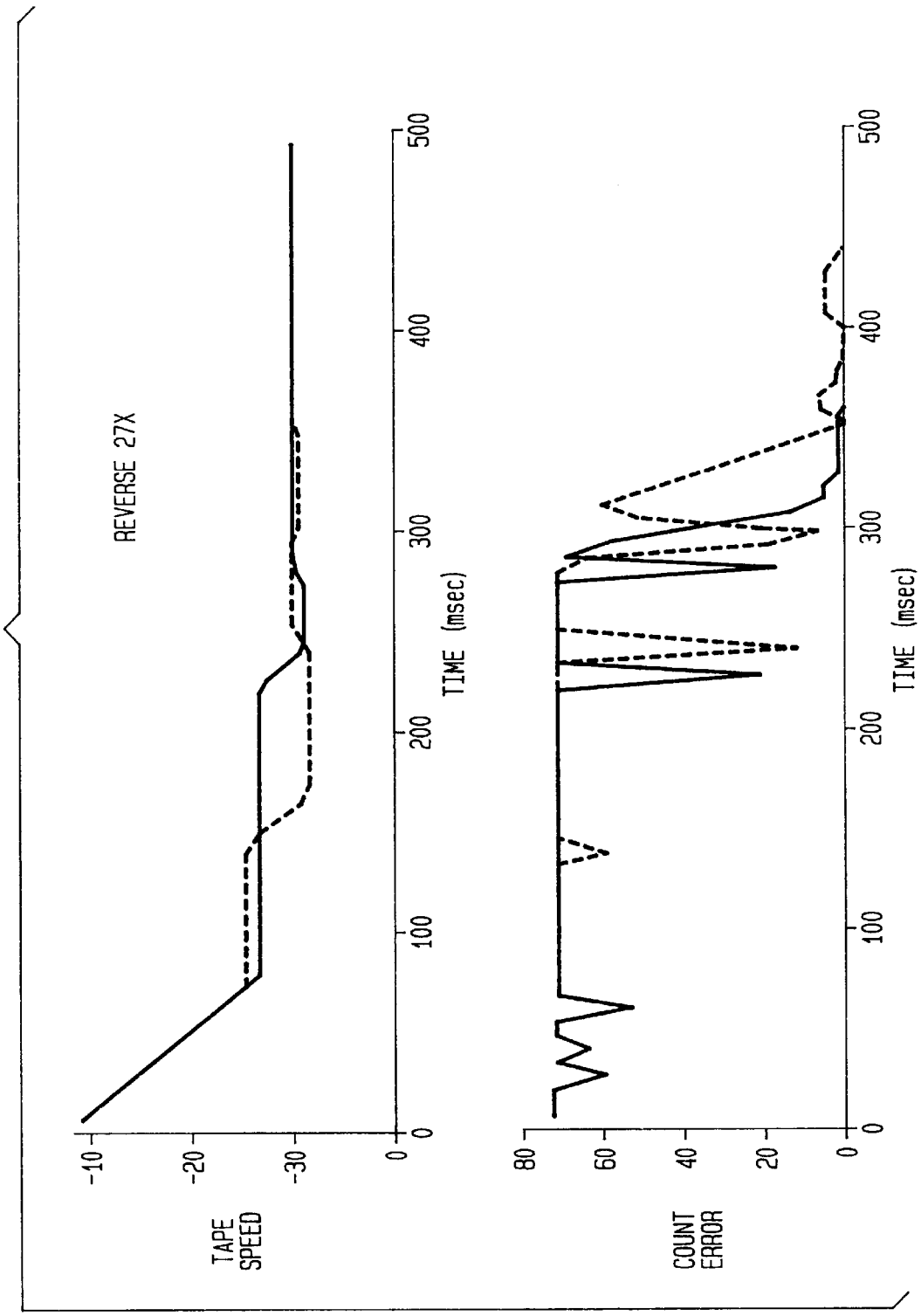

FIGS. 16–18 demonstrate simulated tracking results using the above methods. FIG. 16 depicts the results for 3×normal speed forward and reverse playback, FIG. 17 for 9×normal speed forward and reverse playback and FIG. 18 for 27×normal speed forward and reverse playback. As shown, the relative tape transport-drum rotation speed converges to the desired speed, and the head scanning converges to the desired scan path within 300 msec for all trick play modes.

FIG. 19 illustrates the comparison between the direct searching stage technique and the ZCR PLL searching stage technique. As shown, both techniques provide stable solutions. The average settling times for both techniques are summarized in Table 1 below:

TABLE 1

Average Setting Time comparison for Direct and ZCR PLL Techniques

| Trick Play Mode | +3x | −3x | +9x | −9x | +27 | −27 |
|---|---|---|---|---|---|---|
| Direct | 148 ms | 148 ms | 222 ms | 280 ms | 383 ms | 446 ms |
| ZCR PLL | 95 ms | 90 ms | 125 ms | 133 ms | 289 ms | 311 ms |

III. Trick Mode Data Generation

The above sections describe how to format a tape to accommodate trick mode data and how to track such trick mode data during trick mode playback. This section describes how to generate the trick mode data and how to decode and present pictures in trick mode. In this section, a fixed GOP sequence is presumed for purposes of simplicity in illustrating the invention.

Illustratively, the trick mode data is generated from only I pictures. This is because such pictures are encoded as only intrablocks. Such a trick mode encoding scheme is simpler, as may be appreciated from the discussion below, since full decoding is not necessary to generate the trick mode data. However, it is also possible to generate trick mode data from P and B pictures provided they are first fully decoded and then only intra coded.

In order to effect n×normal speed playback, only a fraction of the originally recorded pictures are presented. The precise number of pictures presented may depend on a number of factors including n and the number of pictures in each GOP. In any event, the nominal picture presentation rate is n×the normal picture presentation rate. Ideally, this is achieved by presenting every $n^{th}$ picture which was sequentially recorded. However, this criterion is more difficult to accommodate for purposes of trick mode data generation if every $n^{th}$ picture is not an I picture (because full decoding of P and B pictures will be necessary). Nor is it strictly necessary to do this. Rather, a pull-down technique may be utilized wherein selected I pictures are sequentially displayed for plural intervals. FIG. 20 shows illustrative display schedules for 3×, 9× and 27×normal speed playback trick modes where I pictures are available every 9, 12 or 15 pictures. For example, if a GOP has 12 pictures which are frames, the I pictures will be frames 0, 12, 24, 36, 48, ... , etc. For 9×normal speed playback, frame 0 is presented during intervals 0, 9, 18 and 27, frame 36 is presented during intervals 36, 45, 54 and 63, and frame 72 is presented during intervals 72, 81, 90 and 99, etc.

Figure 21:
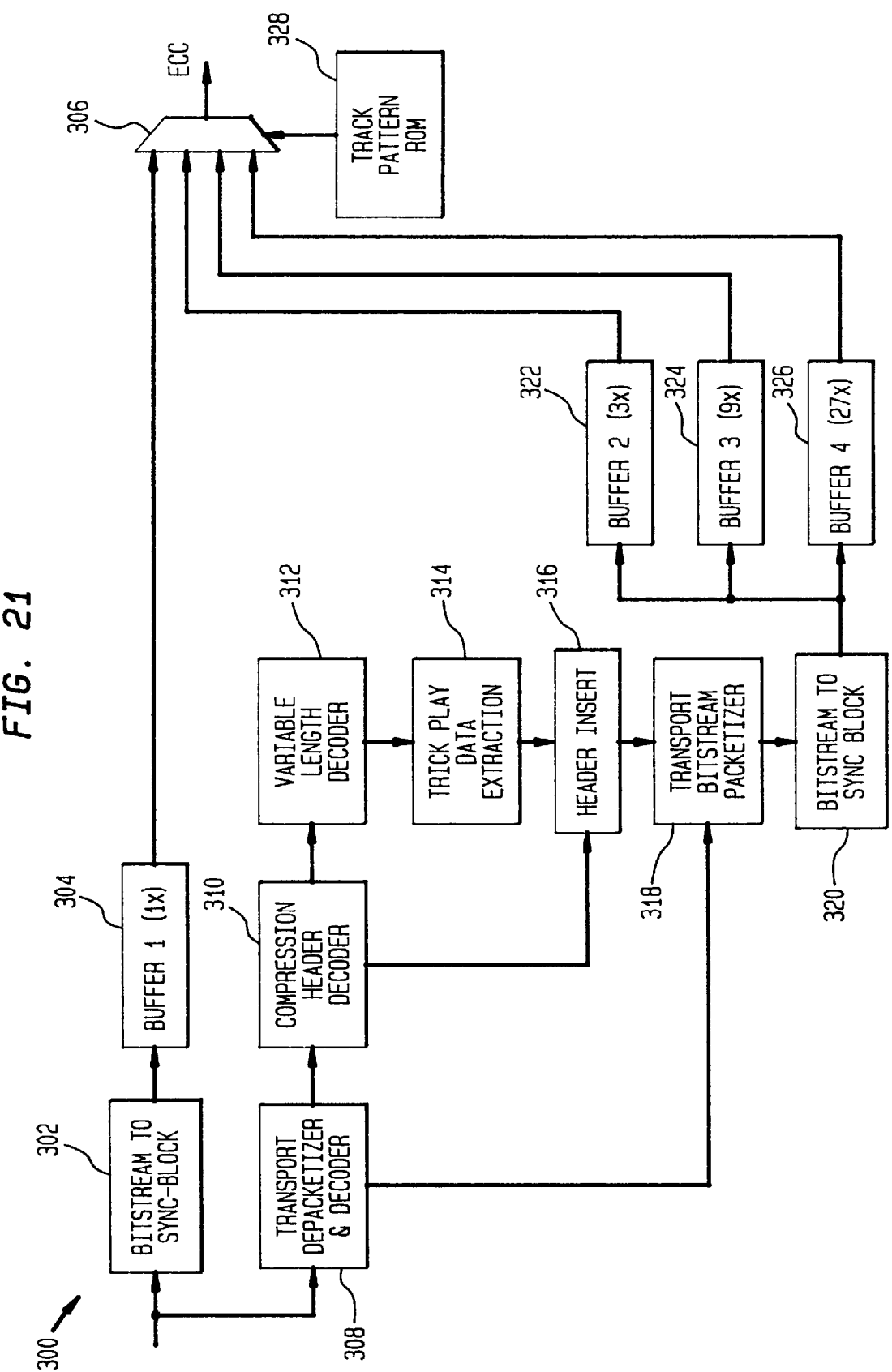
FIG. 21 illustrates a storage layer encoder according to an embodiment of the present invention.

FIG. 21 illustrates a circuit 300 for performing storage layer encoding and formatting, with provisions for trick mode data generation and storage, according to the present invention. An ATV bearing transport stream is received from a transport stream encoder at a bitstream to sync block conversion circuit 302. The bitstream to sync block conversion circuit 302, amongst other things, divides the received ATV bearing transport stream into sync blocks. These sync blocks are outputted to a storage layer rate buffer 304. The purpose of the rate buffer 304 is to enable selective multiplexing of the ATV transport stream and the trick mode data without interrupting the continuous flow of the inputted ATV transport stream. The output of the rate buffer 304 is fed to a multiplexer 306 which is described in greater detail below.

The inputted ATV stream is also received at a transport stream depacketizer and decoder 308. The transport stream depacketizer and decoder 308, amongst other things, separates the compressed video elementary stream from the transport stream. As mentioned above, the ATV transport stream may contain a variety of elementary streams and other information. Selected other information, e.g., selected PSI information, is also stripped from the transport stream and transmitted to the transport stream packetizer 318 (to be described in greater detail below).

The encoded video elementary stream is outputted to a compression header decoder circuit 310. The compression header decoder circuit 310 strips the video compression header information, such as the GOP header, picture headers, etc., from the encoded video elementary stream. Selected header information is transmitted from the circuit 310 to the compression header insertion circuit 316, to be described in greater detail below. The compression header decoder also detects the start of each GOP. Since each GOP is always followed by an I picture, the GOP start code provides a reference for locating an I picture at regular fixed intervals. For instance, if it is known that each GOP contains 9 pictures (sequentially numbered from 0), then pictures 0, 9, 18, 27, . . . must all be I pictures. Such pictures are conveniently used to generate trick mode data. As such, the compression header decoder outputs the compressed video data of each I picture which immediately follows the GOP to a variable length decoder 312.

The variable length decoder 312 receives the encoded intrablocks of each I picture and reproduces the quantized DCT coefficients (in zig-zag scan order). The variable length decoder 312 outputs the DC coefficient and a variable length sequence of the immediately following (i.e., the lowest frequency) AC coefficients of each intrablock to the trick mode data generator circuit 314. The trick mode data generator circuit 314 receives each sequence of coefficients and generates a truncated DCT coefficient sequence for each intrablock as follows. Each AC coefficient is examined in a zig-zag scan order from the DC coefficient until the first non-zero AC coefficient is detected. The zero AC coefficients (if any) and non-zero AC coefficient thus examined in zig-zag scan order form a run or sequence of AC coefficients. The non-zero AC coefficient is compared (in zig-zag scan order) to a threshold ACT. If the non-zero AC coefficient is greater than the threshold $AC_T$, the run of AC coefficients in that block will be extracted and concatenated with an EOB code. Otherwise the run of coefficients is discarded. The retained runs of AC coefficients are then appended to the DC coefficient. Such processing is performed for each intrablock of the selected I pictures. The sequences of retained coefficients thereby produced collectively form the trick mode data.

Advantageously, the threshold $AC_T$ is varied dynamically according to a predetermined bit budget. This allows certain complex pictures (pictures with much luminance and chrominance variation) to use more than the average number of bits allocated to each picture while less complex pictures are provided less than the 20 average number of bits allocated to each picture. Illustratively, the threshold $AC_T$ is calculated by the formula:

$$A = \frac{1}{J}\sum_{j=1}^{J} A_j \qquad (4a)$$

$$AC_T = w(B - B_{dc}) \cdot A \qquad (4b)$$

where
   j is an index from 1 to J
   $AC_T$ is the AC coefficient threshold,
   w is a non-increasing weighting function, A is an average AC coefficient level for selected coefficients in each intrablock of a picture, i.e., for the first non-zero coefficients found in zig-zag scan order from the DC coefficient in each intrablock, $A_j$ is the absolute value, or the square, of the level of the first non-zero AC coefficient in the $j^{th}$ intrablock of an I picture, J is the number of intrablocks in an I picture, B is the target bit budget per frame, and $B_{dc}$ is the total number of bits consumed for all retained DC coefficients per frame.

Figure 22:
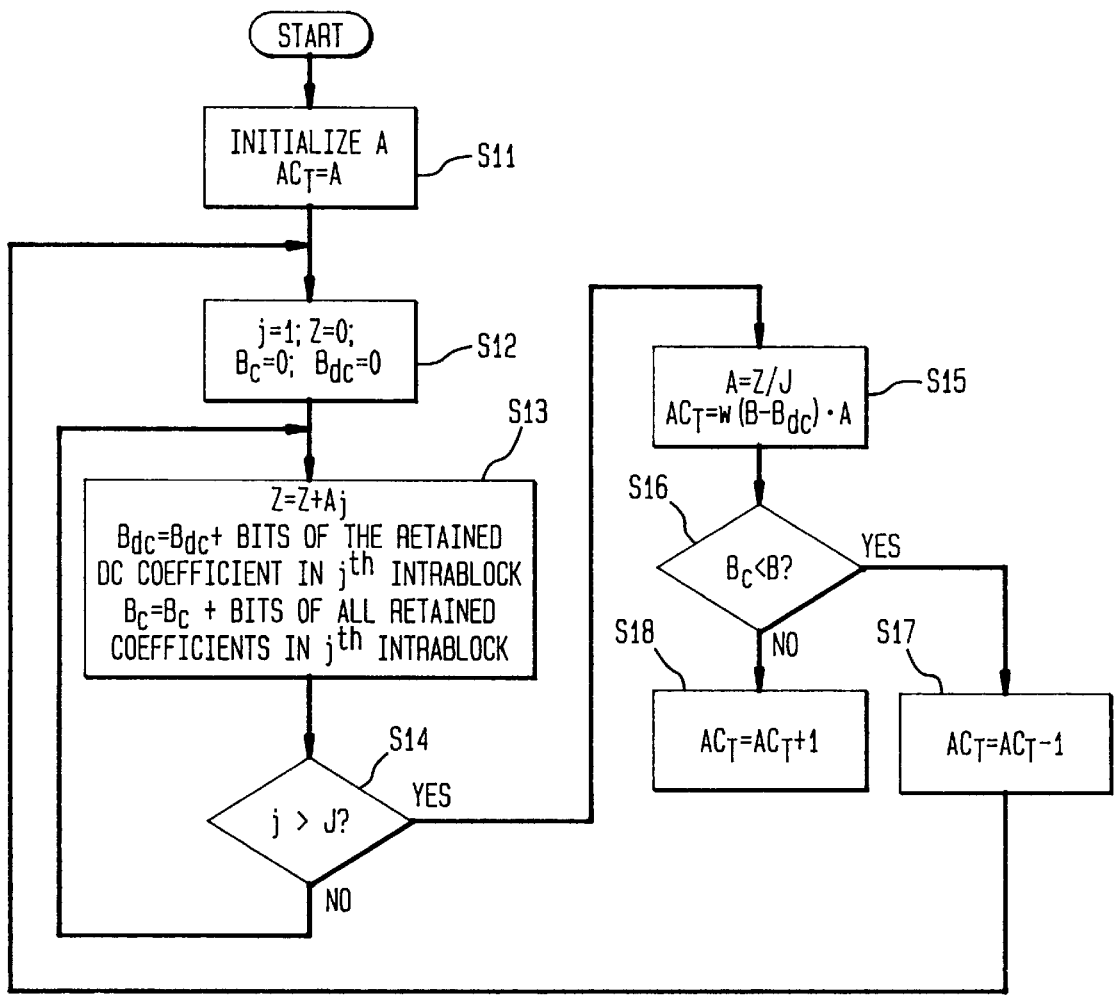
FIG. 22 is a flowchart which schematically illustrates a process for dynamically varying a coefficient threshold.

FIG. 22 illustrates a process for dynamically varying $AC_T$, which process may be executed by a processor (not shown) contained within the trick mode data generator circuit 314. In a first step S11, the processor initializes $AC_T$ as per equations (4a)–(4b). In step S12, the processor initializes an intrablock counter j to 1, an amplitude sum Z to zero, a bit counter $B_{dc}$ to zero, and a used bit counter $B_c$ to zero. In step S13, the processor adds the bits of each retained DC coefficient to $B_{dc}$. The processor examines each AC coefficient, starting from the DC coefficient, in zig-zag scan order, until the first non-zero AC coefficient is found. The processor adds the absolute value or square of the first non-zero AC coefficient in the $j^{th}$ intrablock ($A_j$) to Z. Furthermore, the processor compares the first non-zero AC coefficient of the $j^{th}$ intrablock to $AC_T$ in the above described fashion to determine whether or not to retain the run of AC coefficients. If the processor retains a run of AC coefficients, the processor adds the bits of the retained AC coefficient to $B_c$. After processing all coefficients in the intrablock, the processor increments the intrablock counter j by 1. In step S14, the processor determines whether all of the intrablocks of one I picture have been examined by the trick mode data generator circuit 314 by comparing j to J. If j<J (not all intrablocks have been examined), then execution returns to step S13. If all intrablocks of one picture have been examined by the trick mode data generator circuit 314, then the processor executes step S15. In step S15, the processor determines the average amplitude of the selected AC coefficients in each intrablock of the last I picture A (the processor sets A=Z/J). The processor then sets the threshold $AC_T$ equal to $w(B-B_{dc})\cdot A$. Next, in step S16, the processor determines whether the total number of bits extracted in the most recent frame $B_c$ is less than some target bit budget per frame B. If so, the processor decreases $AC_T$, e.g., $AC_T$ is decremented by 1 in step S17. If $B_c \geq B$ then the processor increases $AC_T$, e.g., $AC_T$ is incremented by 1 in step S18. After executing step S17 or S18, execution returns to step S12.

The trick mode data thus generated by the trick mode data generation circuit 314 (FIG. 21) is outputted to a compression header insertion circuit 316. The compression header insertion circuit 316 encodes the trick mode data and includes the information outputted by the compression header decoder 310. The encoded trick mode data is then transferred to a transport stream packetizer circuit 318 which encapsulates the trick mode data in a transport stream. The transport stream generated by the transport stream packetizer circuit 318 is outputted to a transport stream to sync block conversion circuit 320. Like the transport stream to sync block conversion circuit 302, the transport stream to sync block conversion circuit 320 divides the transport stream into sync blocks. The sync blocks are selectively stored in one or more buffers 322, 324, 326 corresponding to a particular trick mode. The particular pictures for which trick mode data must be calculated depends on the number of pictures in each GOP and the trick modes which are to be supported. The same trick mode data can be used for both forward and reverse playback at a given speed (although such information must be appropriately stored in the correct location for each direction). As noted above, FIG. 20 illustrates the selection of pictures for which trick which trick mode data is generated for 9, 12 and 15 picture GOP's and 3×, 9× and 27×normal speed playback. As shown in FIG. 21, a buffer illustratively is provided for 3×(322), 9×(324) and 27×trick modes (326). Illustratively, if each GOP has 9 pictures, then the 3×buffer 322 will store trick mode data for pictures 0, 9, 18, 27, 36, 45, 54, . . . the 9×buffer 324 will store trick mode data for pictures 0, 27, 54, 81, . . . and the 27×buffer 326 will store trick mode data for pictures 0, 81, . . . . The sync blocks of each buffer 322, 324, and 326 are then selectively multiplexed with the sync blocks containing the normal playback speed picture by multiplexer 306. Illustratively, the multiplexer 306 is a sophisticated switch, which may rely on a track pattern ROM 328, for multiplexing the data of each buffer 322, 324 and 326. For instance, the track pattern ROM 328 may indicate an appropriate selection sequence to produce tracks formatted as described above in section I. The multiplexed sync blocks are then error correction coded and recorded on the tracks of the tape.

Figure 23:
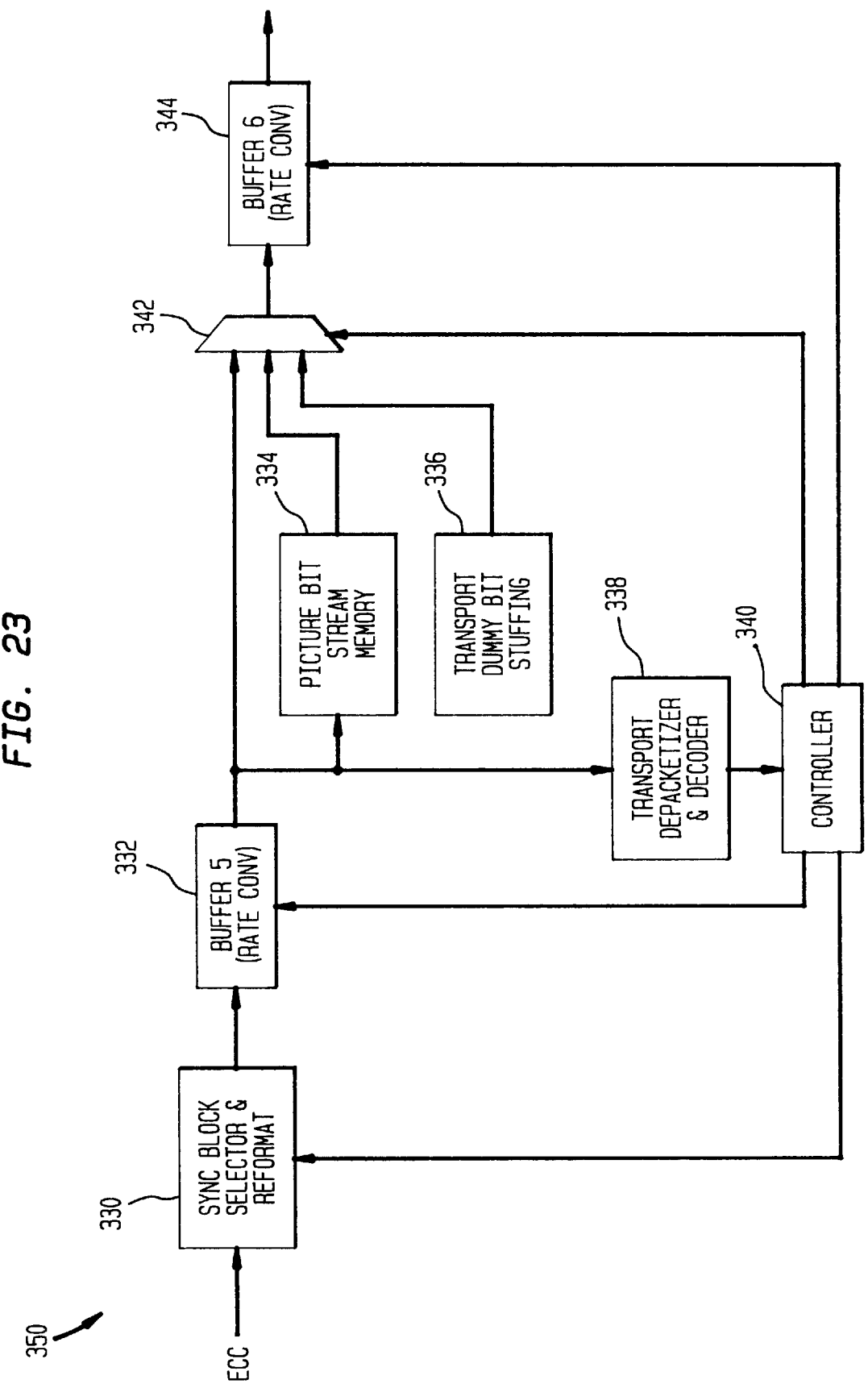
FIG. 23 illustrates a storage layer decoder according to the present invention.

FIG. 23 shows an illustrative storage layer decoder 350. Sync blocks are reproduced by the heads from various track portions, including the trick mode data areas. These reproduced sync blocks are error corrected. The error corrected sync blocks are inputted to a sync block selector and reformatter circuit 330. Under control of a controller circuit 340 (to be described in greater detail below), the sync block selector and reformatter circuit 330 selects only those sync blocks in the trick mode data areas corresponding to the currently utilized trick mode. The sync block detector and reformatter circuit 330 also extracts the transport layer stream (i.e., the transport packets) from the sync blocks of the selected trick mode data bearing sync blocks. The recovered transport stream is inputted to a rate conversion buffer 332. Under control of the controller 340, the rate buffer 332 outputs portions of the transport stream or delays outputting data. In effect, the rate buffer 332 assists in converting the recovered trick mode data bearing transport stream from the SD VCR data rate (of 25 M bits/sec) to the ATV data rate (nominally of 19.2 M bits/sec).

The transport stream packet data is outputted from the rate buffer 332 to a multiplexer 342, a picture memory 334 and a transport depacketizer and decoder 338. The multiplexer 342 selects trick mode picture bearing transport stream data from the rate buffer 332, trick mode picture bearing transport stream data from the picture memory 334 or a stuffing packet from the transport and dummy bit stuffing circuit 336. The transport bit and dummy bit stuffing circuit 336 outputs a stuffing packet to maintain an appropriate data rate even if no trick mode data is available for output. The picture memory 334 stores the trick mode data for a single picture. As noted above, a pull-down technique may be utilized for trick mode playback. In a pull-down technique, a picture may be sequentially presented plural times. The picture memory 334 enables repeatedly decoding and presenting a picture plural times without requiring that the data for the picture be recorded on the tape plural times. Rather, the trick mode data for decoding and presenting a repeated picture may be recorded only a single time and then simply outputted from the picture memory 334 one or more times to effect plural decoding and presentation.

The transport stream depacketizer and decoder 338 separates certain control information from the transport stream. As noted above in the discussion of the encoder, the trick mode data is illustratively inserted into a transport stream, for example, as a private data stream. This private data stream may contain information such as indications as to which pictures are to be repeated, which pictures contain a truncated sequence of AC coefficients, the particular trick mode of the data area (and therefore which sync blocks are to be selected for trick mode playback), and possibly other decoding and presentation information. This information is separated and outputted to the controller circuit 340.

In response to the information contained in the transport stream, the controller circuit 340 causes the sync block selector and reformatter to select only the sync blocks containing the correct trick mode data bearing transport stream. In addition, the controller circuit 340 uses indications in the transport stream to determine if the most recently presented picture is to be repeated or if the next picture of the transport stream is to be presented. Based on this information the controller circuit 340 controls the outputting of information from the rate buffer 332 (into the picture memory 334 and to the multiplexer 342) and the selection of the multiplexer 342. The controller 340 may cause the multiplexer 342 to select a stuffing packet from the dummy bit stuffing circuit 336 in accordance with information contained in the transport stream or may simply determine to do so without assistance. For example, it may be necessary to output transport packets at a certain rate to maintain a nominal data rate (to prevent transport stream decoder buffers from underflowing). MPEG II provides that dummy packets may be inserted into the bitstream to maintain such a data rate. However, it is wasteful to record such dummy packets on the tape. Therefore, a lower bandwidth transport stream may be recorded on the tape, which transport stream is adapted to a higher bit rate by packet stuffing.

The trick mode data bearing transport stream is outputted by the multiplexer 342 to another rate buffer 344. Like the rate buffer 332, the rate buffer 344 assists in converting the (25 M bit/sec) SD VCR data rate stream to an (nominal 19.2 M bit/sec) ATV data rate stream. The rate buffer 344 is also controlled by the controller circuit 340.

Thus, the decoder enables the playing back, i.e., the reproduction and decoding of trick mode data separately and independently of the other compressed video data (i.e., the compressed video data which is played back at normal speed).

As a demonstration of the above trick mode playback data generation, 3×, 9× and 27×normal speed forward and reverse playback were provided with the following bit budgets B:

$$B = \frac{300 \text{ tracks}}{\text{second}} \cdot \frac{n \text{ seconds}}{30 \text{ frames}} \cdot \frac{24 \text{ sync blocks}}{\text{tracks}} \cdot \frac{77 \text{ bytes}}{\text{sync block}} \quad (5)$$

Figure 24:
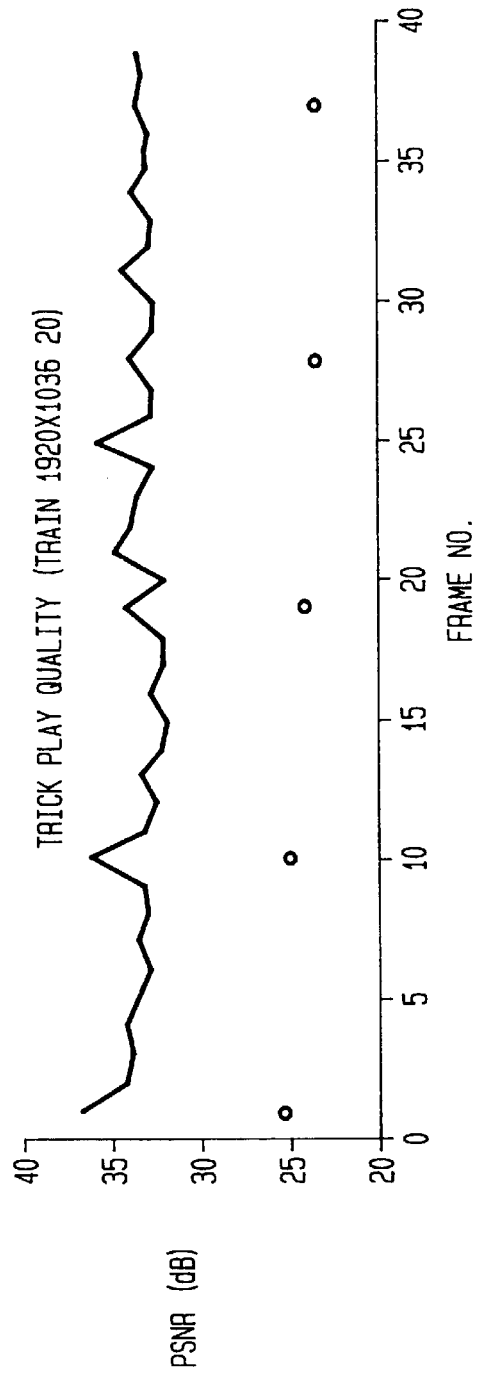
FIGS. 24–25 graphically compare the normal speed PSNR and the trick mode playback speed PSNR.
Figure 25:
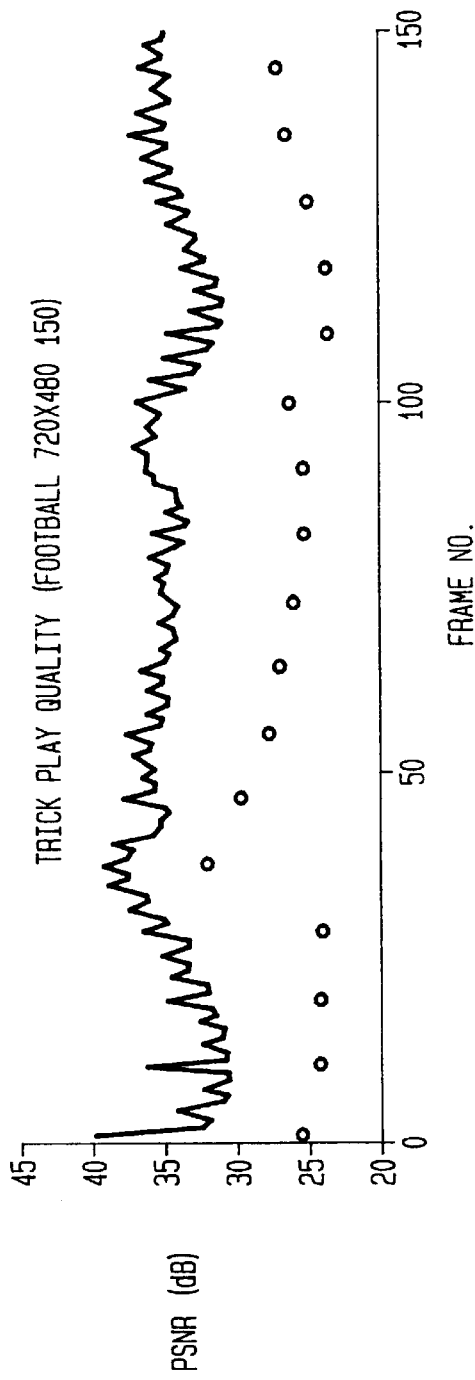

The trick play quality of two different programs (one of a moving train like vehicle and the other of a professional football game) using these budgets is graphically illustrated in FIGS. 24–25. In FIGS. 24–25, the picture signal to noise ratio (PSNR) for frames played back at normal speed is shown by a solid line whereas the PSNR of frames played back using trick mode circuits and techniques described above are shown by circles. As shown, the trick mode playback pictures show approximately a 10 dB degradation in PSNR. Thus, the trick mode data generation provides for good picture presentation during trick mode playback.

Conclusion

In summary, the present invention provides a storage layer stream tape format for physically storing the trick mode data for compressed video. The present invention also provides for tracking the trick mode data areas of the tape on which the trick mode data is recorded. Furthermore, the present invention provides for generating trick mode data during recording, which additional information facilitates trick mode playback. The present invention therefore provides a feasible and simple solution for providing trick mode playback of compressed video in a digital VTR.

Finally, the above discussion is intended to be merely illustrative of the invention. Those having ordinary skill in the art may devise numerous embodiments of the invention without departing from the spirit and scope of the following claims.

The claimed invention is:

1. A magnetic tape comprising:
    a plurality of tracks on said tape containing magnetically recorded signals;
    a first plurality of portions of said magnetically recorded tracks comprising magnetically recorded signals representing a compressed normal speed playback version of a video signal; and
    a second plurality of portions of said magnetically recorded tracks comprising magnetically recorded signals representing a compressed n×playback speed version of said video signal, where n is an integer other than 0 and 1,
    wherein each magnetically recorded track portion of said second plurality comprising a regularly interleaved pattern of magnetic signals physically laid out on said respective track, said pattern including magnetic signals representing a sync word, an identifier and data of said n×playback speed version of said video signal,
    wherein said identifier being identical within each of said magnetically recorded track portions representing said compressed n×playback speed version of said video signal for a particular value of n and indicating said particular value of n, and
    wherein a tracking circuit compares a count of the identifiers during each scan interval with a target number, such that the tape speed will be adjusted based on the comparison.

2. The video tape of claim 1 wherein said second plurality are located within an area delineated by boundaries that are a predetermined distance from a predetermined ideal magnetic head scan path and wherein said predetermined scan path depends on a relative speed of a transport of said video tape and a rotation of said drum during n×normal speed playback.

3. The video tape of claim 1 wherein said ideal magnetic head scan path is at a deviation angle $\theta_f$ for an n×normal speed forward playback and at a deviation angle $\theta_r$ for an n×normal speed reverse playback where $$s = \frac{n \cdot 2 \cdot T_p}{\sin\theta_a} \quad (1a)$$

$$\theta_f = \arcsin\left(\frac{s \cdot \sin\theta_t}{\phi_s \cdot \pi}\right) - (\theta_a - \theta_t) \quad (1b)$$

$$\theta_r = \theta_a - \arctan\left(\frac{\phi_s \cdot \pi \cdot \sin\theta_t}{s + \phi_s \cdot \pi \cdot \cos\theta_t}\right) \quad (1c)$$

where
  s is a parameter used in computing equations (1b)–(1c)
  $\theta_f$ is the fast forward scanning deviation angle
  $\theta_r$ is the fast reverse scanning deviation angle $T_p$ is the track pitch or width $\theta_a$ is the recording track angle $\theta_t$ is the drum head lead in angle, and $\phi_s$ is the drum diameter.

4. The video tape of claim 1 wherein the second plurality of sync blocks further includes a second set of sync blocks to provide playback at a second nxnormal speed greater than the first nxnormal speed, and further wherein the second set of sync blocks includes separate subsets of sync blocks for providing forward and reverse playback.

5. The video tape of claim 1 wherein each of said first and second pluralities contains a multi-layered stream.

6. The video tape of claim 5 wherein said multi-layered stream comprises a transport layer stream and wherein said transport layer stream comprises a video elementary stream which contains said video information.

7. The method of claim 1 wherein the second plurality of sync blocks further includes a second set of sync blocks to provide playback at a second nxnormal speed greater than the first nxnormal speed, and further wherein the second set of sync blocks includes separate subsets of sync blocks for providing forward and reverse playback.

8. A method for providing trick mode playback of compressed video images on a video tape using a rotary drum magnetic head video tape transport recording and playback apparatus comprising the steps of:

recording a plurality of tracks on said tape containing magnetically recorded signals;

recording a first plurality of portions of said magnetically recorded tracks comprising magnetically recorded signals representing a compressed normal speed playback version of a video signal;

recording a second plurality of portions of said magnetically recorded tracks comprising magnetically recorded signals representing a compressed nxplayback speed version of said video signal, where n is an integer other than 0 and 1, wherein each magnetically recorded track portion of said second plurality comprising a regularly interleaved pattern of magnetic signals physically laid out on said respective track, said pattern including magnetic signals representing a sync word, an identifier and data of said nxplayback speed version of said video signal, wherein said identifier being identical within each of said magnetically recorded track portions representing said compressed nxplayback speed version of said video signal for a particular value of n and indicating said particular value of n, and comparing, via a tracking circuit, a count of the identifiers during each scan interval with a target number, such that the tape speed will be adjusted based on the comparison.

9. The method of claim 8 further comprising the steps of:

predetermining an ideal scan path depending on a relative speed of a transport of said video tape and a rotation of said drum during nxnormal speed playback, and recording said second plurality of sync blocks within an area delineated by boundaries that are a predetermined distance from said predetermined ideal magnetic head scan path.

10. The method of claim 8 further comprising the steps of:

determining a deviation angle $\theta_f$, $\theta_r$ for an nxnormal speed playback where $$s = \frac{n \cdot 2 \cdot T_p}{\sin\theta_a} \tag{1a}$$

$$\theta_f = \arcsin\left(\frac{s \cdot \sin\theta_t}{\phi_s \cdot \pi}\right) - (\theta_a - \theta_t) \tag{1b}$$

$$\theta_r = \theta_a - \arctan\left(\frac{\phi_s \cdot \pi \cdot \sin\theta_t}{s + \phi_s \cdot \pi \cdot \cos\theta_t}\right) \tag{1c}$$

where s is a parameter used in computing equations (1b)–(1c)

$\theta_f$ is the fast forward scanning deviation angle $\theta_r$ is the fast reverse scanning deviation angle $T_p$ is the track pitch or width $\theta_a$ is the recording track angle $\theta_t$ is the drum head lead in angle, and $\phi_s$ is the drum diameter.

11. The method of claim 8 wherein each of said first and second pluralities of sync blocks contains a multi-layered stream.

12. The method of claim 11 wherein said multi-layered stream comprises a transport layer stream and wherein said transport layer stream comprises a video elementary stream which contains said video information.

\* \* \* \* \*